US 7,940,651 B2

(12) United States Patent
Shioda et al.

(10) Patent No.: US 7,940,651 B2
(45) Date of Patent: May 10, 2011

(54) MOMENTARY-DISCONNECTION-FREE SWITCHING DEVICE

(75) Inventors: Masahiro Shioda, Kawasaki (JP);
Mitsuhiro Kawaguchi, Kawasaki (JP);
Hideki Matsui, Kawasaki (JP);
Mitsumasa Matsuike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 862 days.

(21) Appl. No.: 11/421,086

(22) Filed: May 31, 2006

(65) Prior Publication Data
US 2007/0189155 A1  Aug. 16, 2007

(30) Foreign Application Priority Data
Feb. 14, 2006  (JP) .................. 2006-037067

(51) Int. Cl.
*G01R 31/08* (2006.01)
*G06F 11/00* (2006.01)
*H04L 12/28* (2006.01)
*H04L 12/56* (2006.01)

(52) U.S. Cl. .................. 370/220; 370/395.51
(58) Field of Classification Search .......... None
See application file for complete search history.

(56) References Cited

U.S. PATENT DOCUMENTS

| | | | | |
|---|---|---|---|---|
| 5,872,780 A | * | 2/1999 | Demiray et al. | 370/359 |
| 5,920,563 A | * | 7/1999 | Fukui et al. | 370/395.5 |
| 6,118,795 A | * | 9/2000 | Fukunaga et al. | 370/503 |
| 6,246,668 B1 | * | 6/2001 | Kusyk | 370/228 |
| 7,436,824 B2 | * | 10/2008 | Pepenella | 370/386 |
| 2003/0053494 A1 | | 3/2003 | Mochizuki | |
| 2003/0095560 A1 | * | 5/2003 | Arita et al. | 370/431 |

FOREIGN PATENT DOCUMENTS

JP  2003-101501  4/2003

OTHER PUBLICATIONS

Li, Optical Communication System is the English translation of PCT/CN04/01052 published as WO 2005/071869, p. 14.*

* cited by examiner

*Primary Examiner* — Chirag G Shah
*Assistant Examiner* — Ashley L Shivers
(74) *Attorney, Agent, or Firm* — Staas & Halsey LLP

(57) ABSTRACT

A read address from a memory and a write address to the memory are transmitted from a VT pointer circuit on an active side to a VT pointer circuit on a standby side in order to eliminate a difference between pointer values of the VT pointer circuits on the active and the standby sides, which is caused by a difference between the phases of the read address from the memory and the write address to the memory of the VT pointer circuits on the active and the standby sides, and the read and the write addresses on the standby side are overwritten with the transmitted address values. As a result, the address values can be made to match both on the active and the standby sides, and also the pointer values can be made to match.

16 Claims, 29 Drawing Sheets

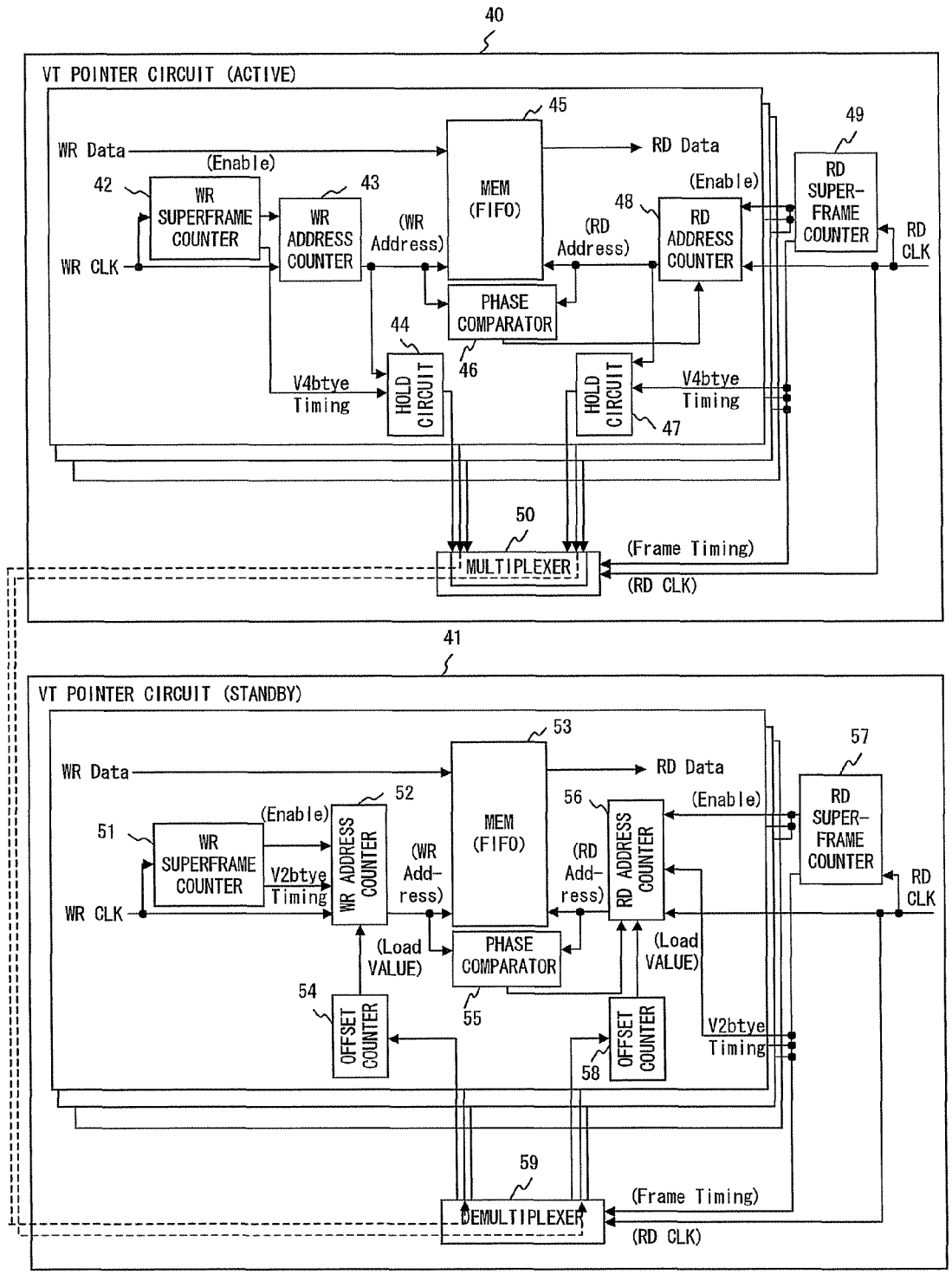
F I G. 16

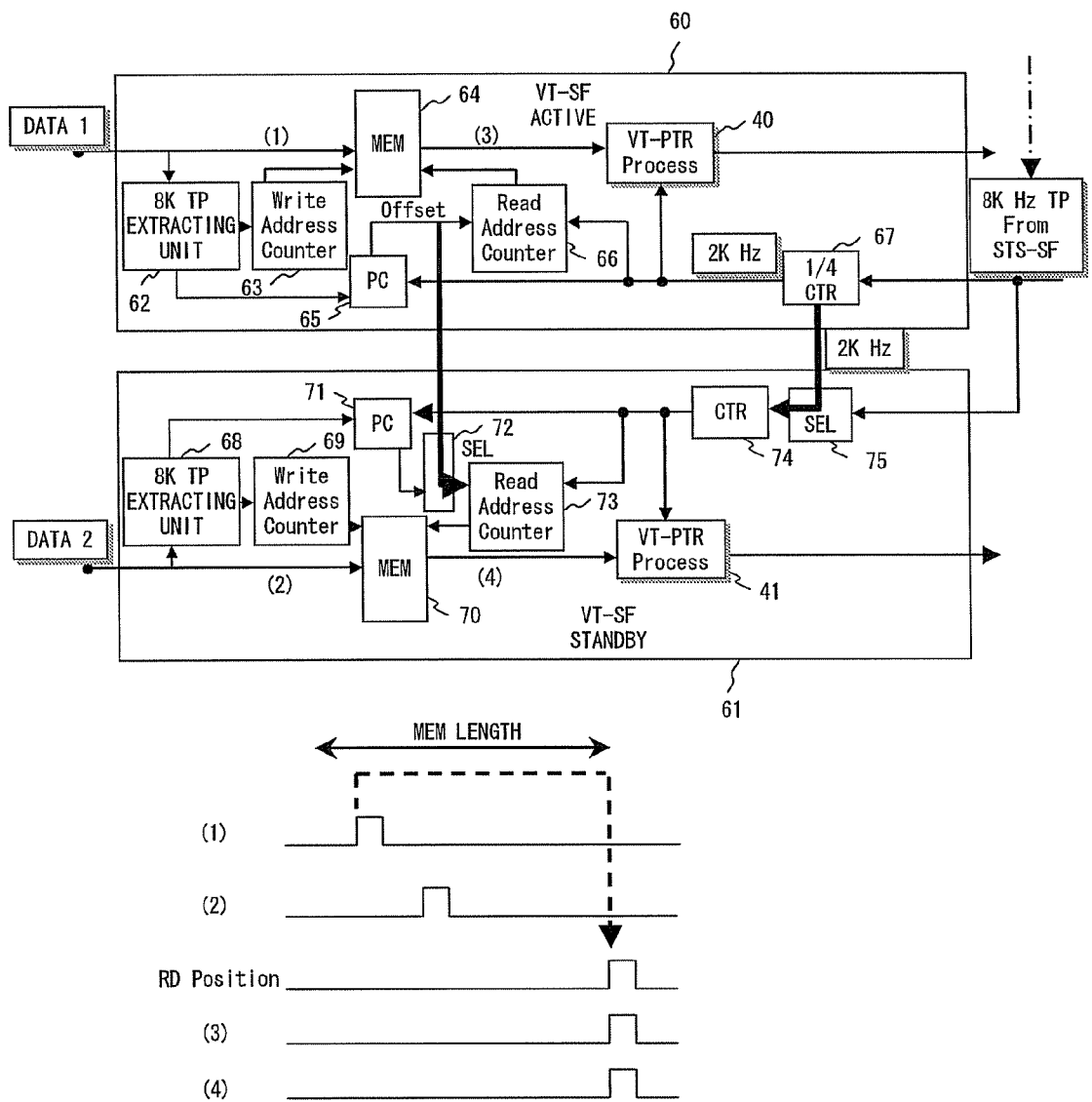
F I G. 17

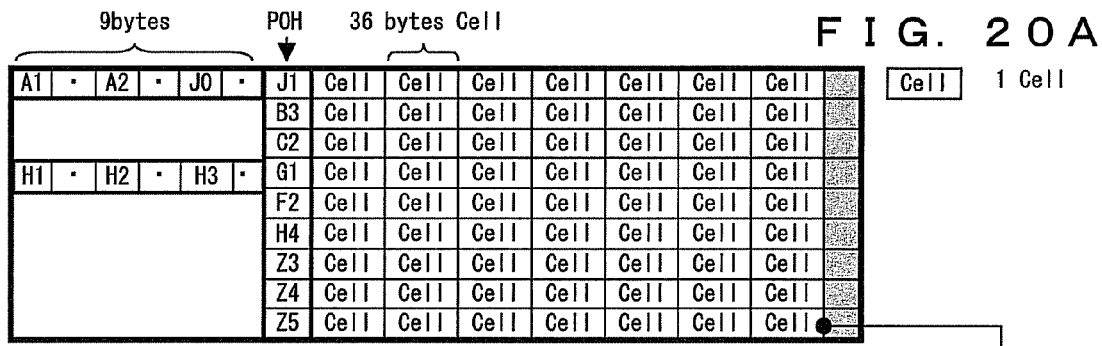

FIG. 20A

| BYTE# | FUNCTION | B1 | B2 | B3 | B4 | B5 | B6 | B7 | B8 |
|---|---|---|---|---|---|---|---|---|---|
| 1 | STS ch No. | X | X | X | X | X | X | X | X |
| 2 | Reserved | | | | | | | | |
| 3 | VTG#1-1 | | | | | Write Address value | | | |
| 4 | VTG#2-1 | | | | | Write Address value | | | |
| 5 | VTG#3-1 | | | | | Write Address value | | | |
| 6 | VTG#4-1 | | | | | Write Address value | | | |
| 7 | VTG#5-1 | | | | | Write Address value | | | |
| 8 | VTG#6-1 | | | | | Write Address value | | | |
| 9 | VTG#7-1 | | | | | Write Address value | | | |
| 10 | VTG#1-2 | | | | | Write Address value | | | |
| 11 | VTG#2-2 | | | | | Write Address value | | | |
| 12 | VTG#3-2 | | | | | Write Address value | | | |
| 13 | VTG#4-2 | | | | | Write Address value | | | |
| 14 | VTG#5-2 | | | | | Write Address value | | | |
| 15 | VTG#6-2 | | | | | Write Address value | | | |
| 16 | VTG#7-2 | | | | | Write Address value | | | |
| 17 | VTG#1-3 | | | | | Write Address value | | | |
| 18 | VTG#2-3 | | | | | Write Address value | | | |
| 19 | VTG#3-3 | | | | | Write Address value | | | |
| 20 | VTG#4-3 | | | | | Write Address value | | | |
| 21 | VTG#5-3 | | | | | Write Address value | | | |
| 22 | VTG#6-3 | | | | | Write Address value | | | |
| 23 | VTG#7-3 | | | | | Write Address value | | | |
| 24 | VTG#1-4 | | | | | Write Address value | | | |
| 25 | VTG#2-4 | | | | | Write Address value | | | |
| 26 | VTG#3-4 | | | | | Write Address value | | | |
| 27 | VTG#4-4 | | | | | Write Address value | | | |
| 28 | VTG#5-4 | | | | | Write Address value | | | |
| 29 | VTG#6-4 | | | | | Write Address value | | | |
| 30 | VTG#7-4 | | | | | Write Address value | | | |
| 31 | Reserved | | | | | | | | |
| 32 | Reserved | | | | | | | | |
| 33 | Reserved | | | | | | | | |
| 34 | Reserved | | | | | | | | |
| 35 | CRC-10#1 | | | | | | | CRC10 | |
| 36 | CRC-10#2 | CRC10 | | | | | | | |

FIG. 20B

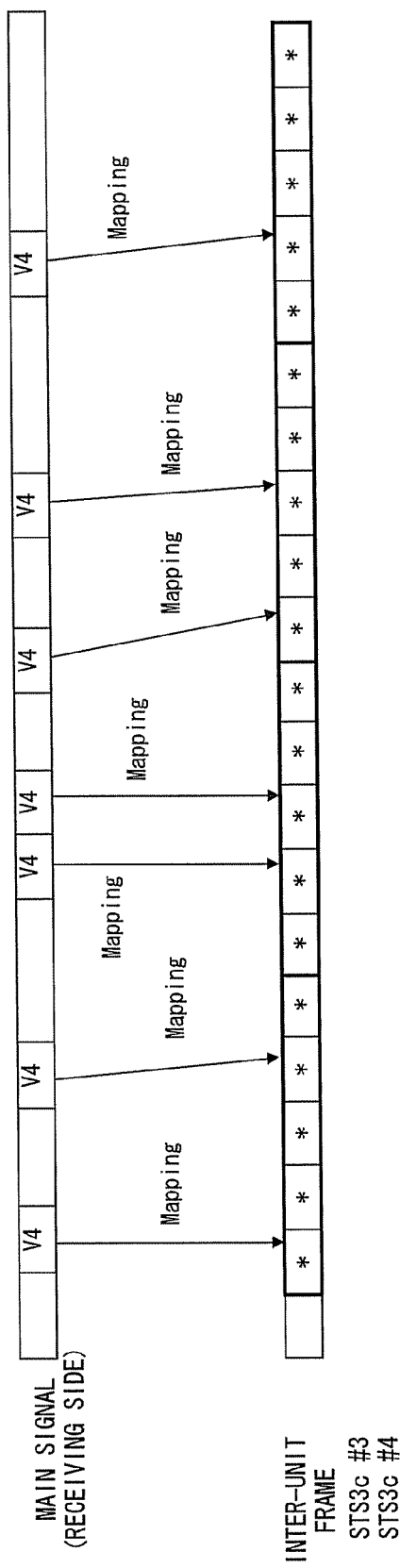
F I G. 2 2

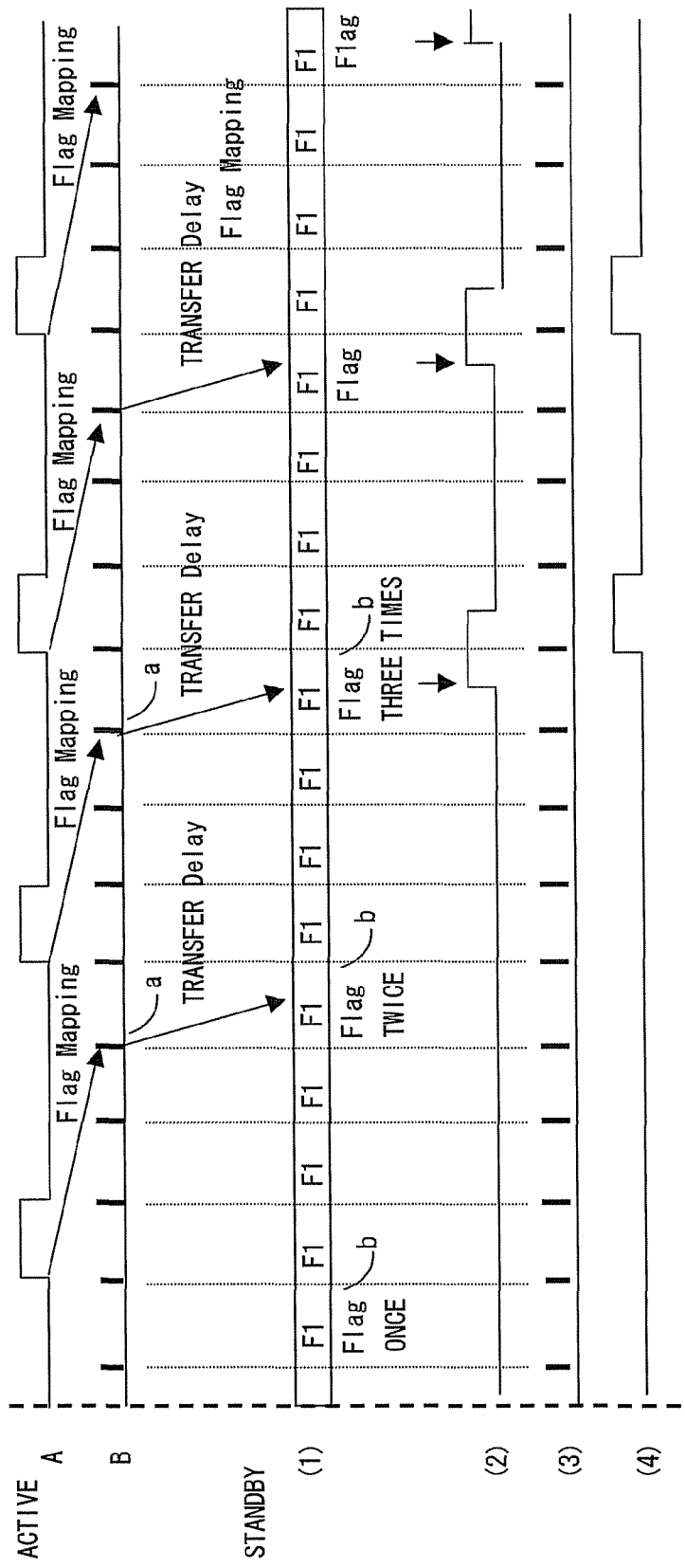
F I G. 2 5

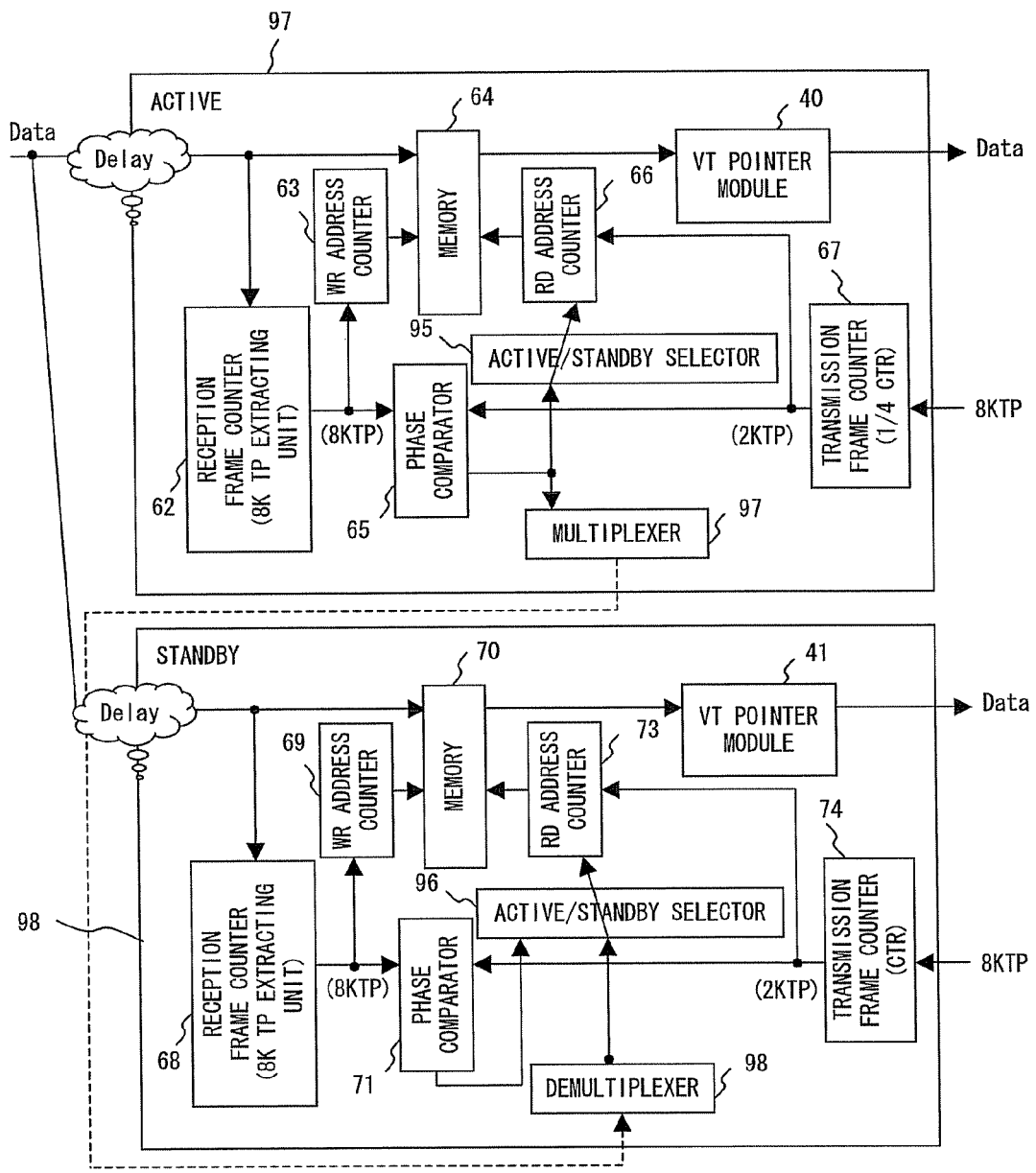
F I G. 27

MOMENTARY-DISCONNECTION-FREE SWITCHING DEVICE

BACKGROUND OF THE INVENTION

1. Field of the Invention

The present invention relates to a momentary-disconnection-free switching device for a signal in an optical synchronous communicating device.

2. Description of the Related Art

The following description is provided by assuming SONET, but a person skilled in the art should easily understand that the description is similarly applicable to SDH.

There is a problem that a momentary disconnection of a signal occurs when switching is made between active and standby devices of Switch Fabrics (VT Switch Fabrics) which crossconnect a VT (Virtual Tributary) signal mapped in an STS-1 payload in a SONET equipment.

FIG. 1 shows the structure of an STS-1 frame in a SONET system. A schematic in the top stage of FIG. 1 represents the STS-1 frame, which is composed of a transport overhead (TOH) and a payload. H1 and H2 bytes of the transport overhead are pointers which indicate a position where data within the payload starts, and H3 is a stuff byte used when negative stuffing is made. A J1 byte indicates the starting position of the payload, and data of a predetermined length, which succeeds the J1 byte, is payload data. As shown in this figure, the payload does not always start at the beginning of the payload of the STS-1 frame, and is designed to start at an arbitrary position. Therefore, the starting position of the payload is indicated by the H1 and H2 bytes.

A schematic shown in the middle stage of FIG. 1 shows the structure of the payload of the STS-1 frame. In the STS-1 payload, VT signals are mapped by 28 channels from a channel 1 to a channel 28. For each of the VT signals, one VT frame is configured by 4 STS-1 frames. In each of the STS-1 frames, a path overhead (POH) is provided, and VT signals having V1 to V4 bytes as a head are subsequently mapped.

A schematic shown in the bottom stage of FIG. 1 shows the structure of a VT frame. The VT frame has V1 to V4 bytes as a header, and the payload of the VT frame starts at a V5 byte. Also the starting position of the VT payload which starts at the V5 byte is not predetermined but starts at an arbitrary position. Accordingly, a pointer which indicates the starting position of the V5 byte is set in the V1 and V2 bytes.

As described above, VT signals of 28 channels are mapped per STS-1. Each of the VT signals is composed of 4 multiframes, and its Flag (00h to 03h) is buried in an H4 byte. The VT frame is configured by 108 bytes obtained by multiplying 27 and 4, and the V1 and V2 bytes are pointer bytes which indicate the position of the V5 byte, the beginning of the VT payload.

FIGS. 2A and 2B explain a VT pointer.

Referring to FIG. 2A, V1 and V2 bytes are composed of NDF bits, SS bits, and a "10"-bit pointer. A V3 byte is composed of a deletion bit for making negative stuffing and an addition bit for making positive stuffing. The V3 byte accommodates the data of the payload at the time of negative stuffing. Referring to FIG. 2B, for a time series data sequence when a VT frame is transmitted, the V1 byte is initially transmitted, and the data of the payload is transmitted thereafter. Data next to the V1 byte is the payload data the pointer value of which is 78. Thereafter, payload data the pointer values of which are up to 103 succeed. Next, the V2 byte is transmitted. Data next to the V2 byte is payload data the pointer value of which is 0. Thereafter, data the pointers values of which are up to 25 succeed. Then, the V3 byte is transmitted. The V3 byte is a stuff byte. The number of bits of the V3 byte is decreased when negative stuffing is made, whereas the number of bits of the V3 byte is increased when positive stuffing is made. The V3 byte is a negative stuff byte, and copes with an increase/decrease in a pointer value by accommodating a portion of data of the payload in the V3 byte when negative stuffing is made, or by unaccommodating data in a byte next to the V3 byte when positive stuffing is made. Payload data the pointer values of which are from 26 to 51 succeed the V3 byte. Next, a V4 byte succeeds, and payload data the pointer values of which are 52 to 77 succeed the V4 byte.

Conventionally adopted is a method for arranging a pointer circuit in a stage preceding a crossconnect circuit in order to effectively configure the scale of the crossconnect circuit for the crossconnection of a VT signal (see Patent Document 1).

In a SONET transmitting device, a VT Switch Fabric (VTSF) is formed to be able to be mounted/unmounted in accordance with Network Application on a user side, and Switch Fabric mounted with a pointer circuit and a crossconnect circuit are popularized.

FIG. 3 shows Switch Fabrics each of which is mounted with a VT pointer circuit and a crossconnect circuit.

An STS signal input to an interface 10 undergoes a pointer process of an STS signal level in an STS pointer circuit 11. Interfaces 10 are provided by a number that can accommodate the lines of STS-SFs (Switch Fabrics) 12 and 13. Also STS pointer circuits are provided by the same number. The STS-SFs 12 and 13 have a redundant configuration of active and standby. An STS-1 signal selected by the STS-SF 12 is input to a VT-SF (Switch Fabric) 14. STS-1 signals from both of the active and the standby fabrics are selected by selectors 16 and 19. Then, a VT pointer process is performed in VT pointer circuits 17 and 20, and a crossconnect process is performed in VT crossconnect circuits 18 and 21. The signal for which the VT crossconnect process is performed is fed back to the STS-SFs 12 and 13 via selectors 22 and 23, and input to an interface 24 via a selector 25 for switching between active and standby. Then, the STS-1 signal after the crossconnect process is performed is output from the interface 24. If VT crossconnect is not required, the VT-SFs 14 and 15 can be unmounted.

In the meantime, with the advance of device technology and with a growing demand of a network, the line processing capacity of a VT Switch Fabric increases, and an influence exerted by a momentary disconnection of a line, which occurs when switching is made between active and standby circuits of Switch Fabrics at the time of maintenance, has become unignorable, leading to a vital demand for the necessity of momentary-disconnection-free switching.

To resolve this, a technique for arranging a VT pointer circuit in an interface unit of a SONET transmitting device is sometimes adopted. In this case, however, a VT pointer circuit is always mounted even when VT Switch Fabric is not used, which is not economic.

FIG. 4 shows Switch Fabric having a configuration where a VT pointer circuit is provided within an interface device. In this figure, the same constituent elements as those shown in FIG. 3 are denoted with the same reference numerals of FIG. 3, and their explanations are omitted.

In FIG. 4, VT pointer circuits are removed from VT-SFs 14a and 15a. Alternatively, a VT pointer circuit 30 is provided within an interface 10a. A signal for which a pointer process is performed by an STS pointer circuit 11, and a signal for which a pointer process is performed by the VT pointer circuit 30 are selectively output by a selector 31.

FIG. 4 shows one example where momentary-disconnect-free switching of VT-SF is made. Namely, the VT pointer circuit is arranged in the interface 10a. In this case, a VT pointer is processed in the interface 10a, and its signal is branched by STS-SFs 12 and 13. Therefore, pointer values that indicate the starting position of VT payload data always become the same value in both active and standby VT-SFs 14a and 15a, whereby momentary-disconnection-free switching can be made. However, a VT pointer circuit must be arranged in all cases even if a VT line is not processed. As a result, the scale of the circuit of the entire device and its cost increase.

Accordingly, expectations that momentary-disconnection-free switching is made with VT Switch Fabric mounted with a pointer circuit as conventional are raised.

[Patent Document 1] Japanese Patent Application Publication No. 2003-101501

There is a case where different pointer values are inserted and output on active and standby sides when a pointer process is performed in VT Switch Fabrics which are redundantly arranged within a device. Three factors exist as a cause of this case.

FIG. 5 shows the fundamental configuration of a VT pointer circuit.

The VT pointer circuit is configured by a memory 35, a WR (Write) address counter 37, an RD (Read) address counter 38, and a phase comparator 36. The WR address counter 37 counts write addresses from 0 to 7 according to an enable signal which is synchronous with write data (WR data). The write data is written to an address output from the WR address counter 37 of the memory 35. The RD address counter 38 is a counter for issuing an instruction to read from which address of the memory 35 data is to be read. Also this counter counts read addresses from 0 to 7 according to an enable signal. The phase comparator 36 detects a difference between the address values of the WR address counter 37 and the RD address counter 38, and controls the RD address counter 38 in order to keep the difference to be a definite value.

In the memory 35, addresses from 0 to 7 are defined, data write and read to/from the memory 35 are performed based on the address counters both on WR (write) and RD (read) sides. To prevent the data write and read operations from conflicting with, the phase comparator 36 for obtaining a phase difference value is arranged. If the phase difference value enters an INC/DEC region (a window indicating a difference value of phases in order to determine whether or not to perform a stuff process), a pointer value of a pointer inserting unit (not shown) is updated, and negative stuffing and positive stuffing are made to move a phase difference between the data write and read to/from the memory 35 to a normal operation region. As a result, a signal can be communicated without losing data.

The initial state of the phase comparator 36 starts at a difference value of 4 as a result of a comparison made between respective counter values. However, the difference decreases or increases with fluctuations in the phase on the WR side. In the configuration of the pointer circuit shown in FIG. 5, three addresses such as 3, 4, and 5 exist in the normal region, but gaps of OH (V1 to V4) exist for a VT payload signal. Therefore, a phase comparison result becomes a pattern which repeats 3<->4 or 4<->5.

In FIG. 5, portions of the WR address, which are enclosed with thick lines, are INC and DEC regions.

FIGS. 6 and 7 explain operations performed when an OH gap occurs with reference to power-up time.

As described by referring to FIG. 5, the WR address counter 37 and the RD address counter 38 run when an enable signal is input. Accordingly, if the enable signal does not exist, namely, if data conflicts with the timing of an overhead (OH) (conflicts with the timings of the V1 to V4 bytes), the counting of the counter values stops. The state where the counting stops is referred to as an occurrence of a gap. Therefore, a phase difference between the write and the read sides changes with the timing when the counting stops on the write and the read sides.

FIG. 6 shows a case where an OH gap initially occurs on the write side, whereas FIG. 7 shows a case where an OH gap initially occurs on the read side.

In FIG. 6, in the initial state, WR addresses of WR data are counted from 0 to 7, and the counting of RD addresses of RD data starts when the WR address is 4 (1). Accordingly, a phase comparison result PC becomes 4 at this time. When any of the V1 to V4 bytes is input on the WR data side (represented as "v" in FIG. 6), a gap occurs and the WR address counter once stops. Therefore, the counting of the WR addresses delays by 1. However, since a gap has not occurred yet in the RD data, the RD address counter continues to count. Accordingly, an RD address becomes 0 when the WR address is 3, and the phase comparison result PC becomes 3 (2). Next, when a gap occurs on the RD data side, the RD address counter once stops and the counting of the RD addresses delays by 1. As a result, restoration is made to the initial state where the RD address is 0 when the WR address is 4 (3). Accordingly, if a gap occurs on the write side first, the phase comparison result comes and goes between 3 and 4.

In FIG. 7, in the initial state, the WR addresses of WR data are counted from 0 to 7, and the counting of the RD addresses of RD data starts when the WR address is 4 (1). Accordingly, the phase comparison result PC becomes 4 at this time. When any of the bytes of V1 to V4 appears on the RD data side (represented as "v" in FIG. 7), a gap occurs and the RD address counter once stops. Therefore, the counting of the RD addresses delays by 1. However, a gap has not occurred yet in the WR data, the WR address counter continues to count. Accordingly, the RD address becomes 0 when the WR address is 5, and the phase comparison result PC becomes 5 (2). Next, when a gap occurs on the WR data side, the WR address counter once stops, and the counting of WR addresses delays by 1. As a result, restoration is made to the initial state where the RD address is 0 when the WR address is 4 (3). Accordingly, if a gap occurs on the read side first, the phase comparison result comes and goes between 5 and 4.

As described above, if the pointer circuit is set so that the phase difference at the time of power-up is initialized to be a position of 4, it runs between 3<->4 if a gap occurs on the WR side first, or runs between 4<->5 if a gap occurs on the RD side first.

In the same devices, no constraints are imposed on times at which active and standby devices are mounted, and accordingly, timings when the active and the standby pointer circuits are powered up are completely independent. Therefore, either of the active and the standby pointer circuits can possibly run between 3<->4 in the normal region of the pointer unit, whereas the other can possibly run between 4<->5 due to the relationship between the timings of power-up of the active and the standby pointer circuits when being mounted.

As described above, if a pointer value is updated as a result of a phase difference which enters an INC region or a DEC region only on the write side of the active and the standby sides, stuffing occurs and the pointer value is newly updated, leading to a difference between the pointer values of the active and the standby sides.

FIGS. 8 and 9 explain a problem posed when the active and the standby sides run in different phases.

FIG. 8 shows an example where Increment instruction reaches the write side and RD-INC (increment) occurs only in an active side VTSF, whereas FIG. 9 shows an example where Decrement instruction reaches the write side, and an RD-DEC (Decrement) occurs only in a standby side VTSF.

In FIG. 8, assume that the active side VTSF runs so that a phase difference between WR and RD addresses comes and goes between 3 and 4, and the standby side VTSF runs so that the phase difference between WR and RD addresses comes and goes between 4 and 5. In this case, if the increment instruction reaches the write side, the phase difference between WR and RD addresses comes and goes between 3 and 4 in the standby side VTSF. In the meantime, the phase difference between WR and RD addresses comes and goes between 2 and 3 in the active side VTSF. However, if the phase difference becomes 2, it enters the INC region. Therefore, an operation for incrementing the read side address counter is performed. Namely, stuffing occurs, which leads to a change in the pointer value. In this way, the pointer values of the active and the standby sides change.

In FIG. 9, assume that the active side VTFS-SF runs so that the phase difference between WR and RD addresses comes and goes between 3 and 4, whereas the standby side VTSF runs so that the phase difference between WR and RD addresses comes and goes between 4 and 5. If the decrement instruction reaches the write side, the phase difference between WR and RD addresses comes and goes between 4 and 5 in the active side VTSF. In the meantime, the phase difference between WR and RD addresses comes and goes between 5 and 6 in the standby side VTSF. However, if the phase difference becomes 6, it enters the DEC region. Therefore, an operation for decrementing the read side address counter is performed. Namely, stuffing occurs, which leads to a change in the pointer value. In this way, the pointer values of the active and the standby sides change.

FIG. 10 explains the second factor which makes the pointer values of the active and the standby sides different.

The pointer circuit makes a comparison between WR and RD addresses in order to prevent the phases of the write (WR) and the read (RD) sides from conflicting with, performs a pointer process when the phase difference enters a predetermined INC region or DEC region, and performs an operation for restoring the phase difference to a normal region. Data which reaches the WR side is data transferred from STS Switch Fabric. The phase on the WR side can possibly shift on the active and the standby sides due to a delay difference of wiring or a device. The shift of the phase on the WR side can possibly make the times of reaching the INC or DEC region different, which makes the pointer values of the active and the standby sides different.

Assume that DATA 1 having a delay time of $\Delta T_1$ is input to the VT pointer circuit of the active side VTSF, whereas DATA 2 having a delay time of $\Delta T_2$ is input to the VT pointer circuit of the standby side VTSF as shown in FIG. 10. If the values of $\Delta T_1$ and $\Delta T_2$ differ, a difference arises in the phases of DATA 1 and DATA 2. This leads to a difference between the pointer processes of the VT pointer circuits on the active and the standby sides. As a result, pointer values differ on the active and the standby sides.

FIGS. 11 and 12 explain the third factor which makes the pointer values of the active and the standby sides different.

An 8-kHz timing pulse is distributed from STS switch Fabric to each interface in order to implement a crossconnection in the STS Switch Fabric in a SONET equipment. Since the VT frame structure is a 2-kHz multi-frame structure in a VT pointer circuit in the VT Switch Fabric, a 2-kHz timing pulse is generated from the 8-kHz timing pulse. Because the references of starting the generation of the 2-kHz timing pulse are mutually independent on the active and the standby sides at this time, starting positions may sometimes differ. Therefore, the timing of data read from the memory in the VT pointer circuit does not become the same as the timing of the transmitting side, which makes the pointer values different.

If the 2-kHz timing pulse is generated from the 8-kHz timing pulse, a ¼ divider is used. At this time, the timing of starting to divide a cycle shifts, thereby generating three types of 2-kHz timing as shown in FIG. 12. If this shift occurs between the active and the standby sides, a difference arises in time distance to the timing of a V5 byte with regard to the 2-kHz timing pulse although the input timings of a V5 byte are the same.

Due to these three factors, a suddenly changed pointer value is fed to a device in a succeeding stage when switching is made from the active side Switch Fabric to the standby side VT Switch Fabric. Normally, a pointer receiving circuit is manufactured in compliance with Pointer Action Rule stipulated in GR-253-CORE of Telcordia. Therefore, an ACT-pointer value (a value that a receiving pointer circuit recognizes as a reception pointer value) is configured not to follow such a sudden change in a pointer value.

FIGS. 13 to 15 explain an operation for changing an ACT-Pointer value.

FIGS. 13 to 15 show Rules for changing a pointer value. The pointer value is changed in an NDF (New Data Flag) state (FIG. 13), or with Stuff control performed by inverting I and D bits (FIGS. 14 and 15). If a difference exists between the pointer values of the active and the standby sides due to the above described factors, conditions shown in FIGS. 13 to 15 cannot be satisfied if switching occurs between the active and the standby sides, and a SONET equipment in the succeeding stage cannot follow a sudden change in the pointer value for a certain time period, leading to an occurrence of a line error.

Accordingly, a VT payload error (line hit) will occur until the SONET device in the succeeding stage again follows the sudden change in the pointer value, which is caused by switching from the active side to the standby side.

SUMMARY OF THE INVENTION

It is an object of the present invention to provide a momentary-disconnection-free switching device for preventing a pointer value from suddenly changing when switching is made from active side VT Switch Fabric to standby side VT Switch Fabric, and for preventing an error from occurring in a device in a succeeding stage, by making pointer values output from pointer circuits, which are arranged on the active and the standby sides, match all the time.

A momentary-disconnection-free switching device according to one preferred embodiment of the present invention is a momentary-disconnection-free switching device, which processes a data frame of a synchronous communication network, in a redundant network device. This device comprises: a first pointer processing unit for processing a pointer which indicates the starting position of a payload included in a subframe accommodated by the data frame; a second pointer processing unit, as a standby device of the first pointer processing unit, for processing a pointer which indicates the starting position of a payload included in the subframe; and a transferring unit for transferring values of data write and read to and from a memory, which are used to process the pointer, from the first pointer processing unit to the second pointer processing unit. The second pointer processing unit processes the pointer by using the write and the read address values transmitted from the first pointer processing unit.

According to the present invention, pointer values of output signals of Switch Fabrics each mounted with a pointer circuit and a crossconnect circuit, as a representative example of a form where a fabric can be mounted or unmounted in accordance with a network application of a user side, can be made to match on active and standby sides. As a result, momentary-disconnection-free switching between VT Switch Fabrics can be made at the time of maintenance and operations.

BRIEF DESCRIPTION OF THE DRAWINGS

FIG. 16 is a schematic showing a fundamental configuration for solving a problem caused by an overhead gap, according to a preferred embodiment of the present invention;

FIG. 17 is a schematic showing the configuration of a mechanism for solving an occurrence of different pointer values on the active and the standby sides, which is caused by differences between physical delay times and between timings of dividing a clock;

FIGS. 20A and 20B are schematics (No. 3) explaining the data format used when data is transferred from the active side to the standby side shown in FIG. 16 in the preferred embodiment of the present invention;

FIG. 22 is a diagram (No. 2) showing the generation of the STS12 frame;

FIG. 25 is a schematic (No. 2) explaining the method for transmitting 2-kHz timing from the active side to the standby side, and for reproducing a 2-kHz timing clock on the standby side;

FIG. 27 explains a configuration which makes the phases of input data to pointer circuits match.

DESCRIPTION OF THE PREFERRED EMBODIMENTS

FIG. 16 shows a fundamental configuration for solving a problem caused by an overhead gap, according to a preferred embodiment of the present invention.

The WR address of data next to a V4 byte input to an active side in a VT pointer circuit is transferred to a standby side, the standby side then captures the WR address at the timing of the byte next to the V2 byte and the RD address of data next to the V4 byte output on the active side is transferred to the standby side, and the standby side captures the RD address at the timing of the byte next to the V2 byte, whereby the operations of the pointer circuits on the active and the standby sides can be made to match.

At this time, for the timing of the byte next to the V2 byte on the standby side, its count value advances by a payload length in comparison with the timing of the byte next to the V4 byte on the active side. Therefore, an actual write value is not always the same as the counter value transmitted from the active side. Therefore, an offset correction is made. If this correction value is assumed to be N, N depends on the number of stages of the memory in the pointer circuit, and can be represented as follows.

N=payload length−the number of stages of memory *
m (m is the number of times that the address
counter counts while data passes through one
stage of the memory)

Figure 6:
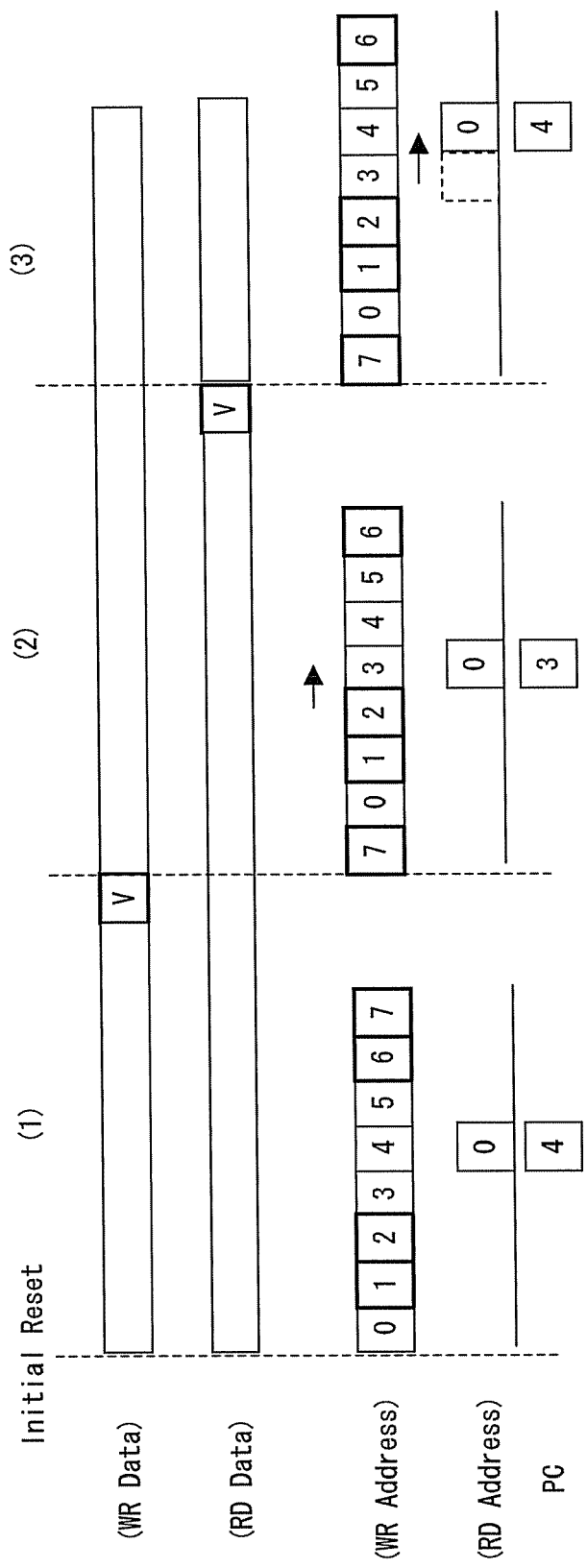
FIG. 6 is a schematic (No. 1) explaining operations performed when an OH gap occurs with reference to power-up time.
Figure 7:
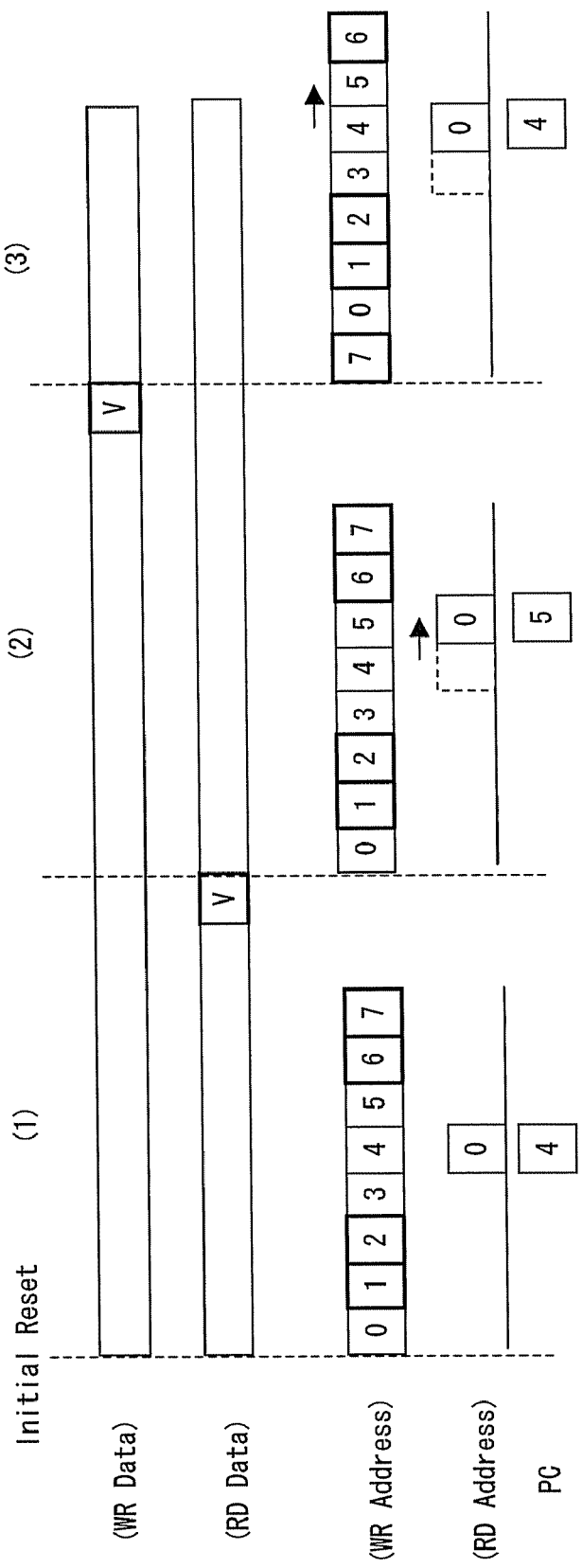
FIG. 7 is a schematic (No. 2) explaining operations performed when an OH gap occurs with reference to power-up time.
Figure 8:
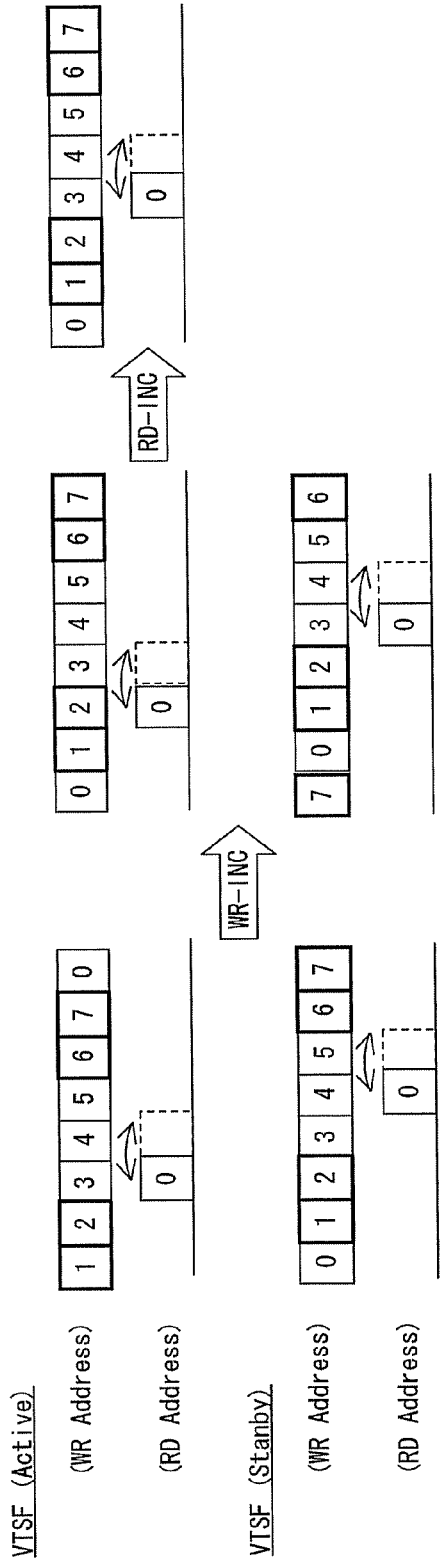
FIG. 8 is a schematic (No. 1) explaining a problem posed when VTSFs on active and standby sides run in different phases.
Figure 9:
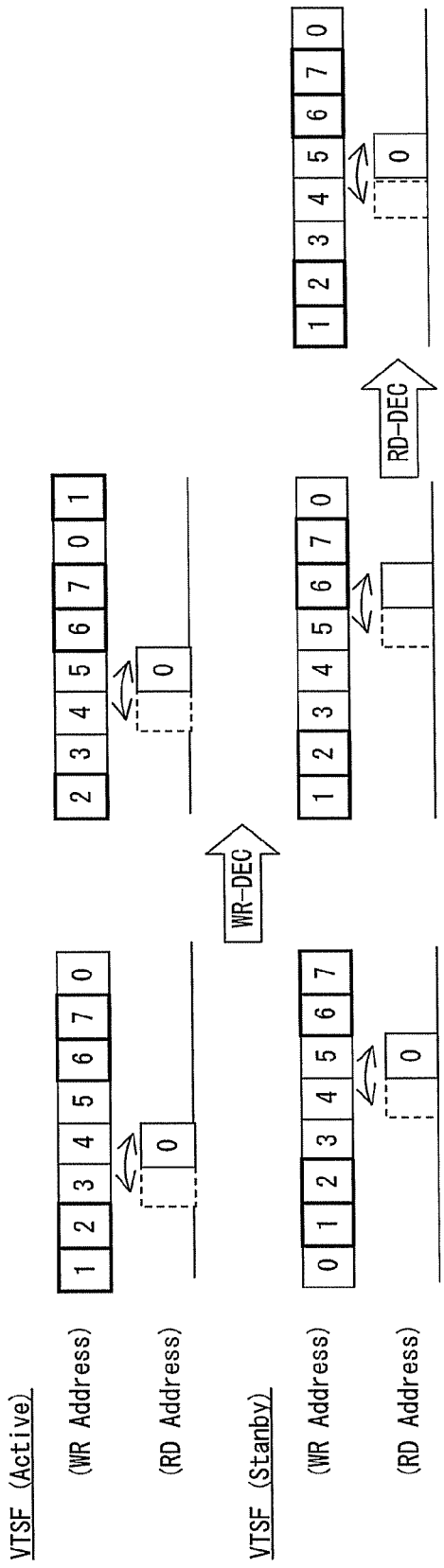
FIG. 9 is a schematic (No. 2) explaining a problem posed when the VTSFs on the active and the standby sides run in different phases.
Figure 10:
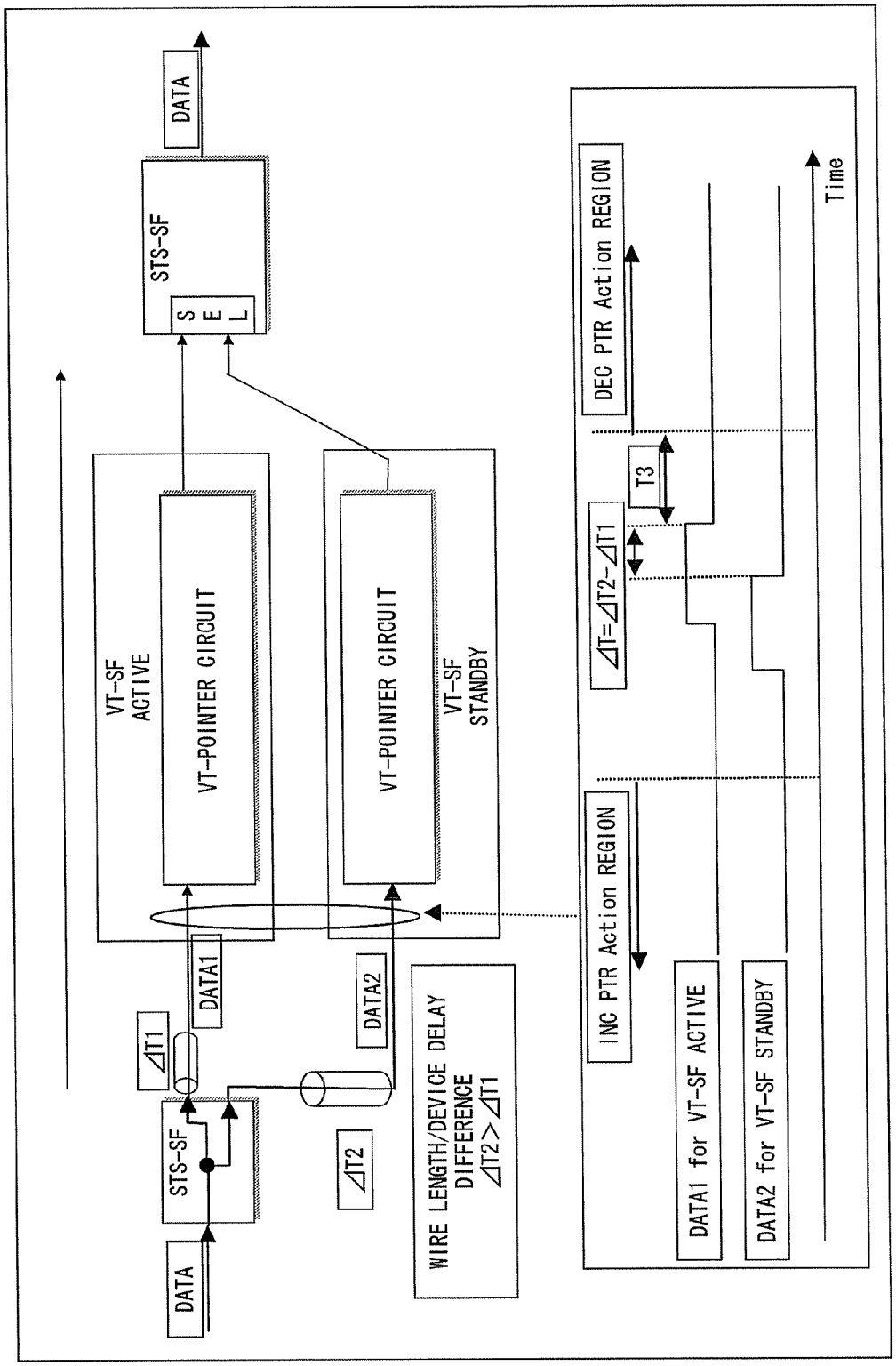
FIG. 10 explains the second factor which makes pointer values of the active and the standby sides different.
Figure 11:
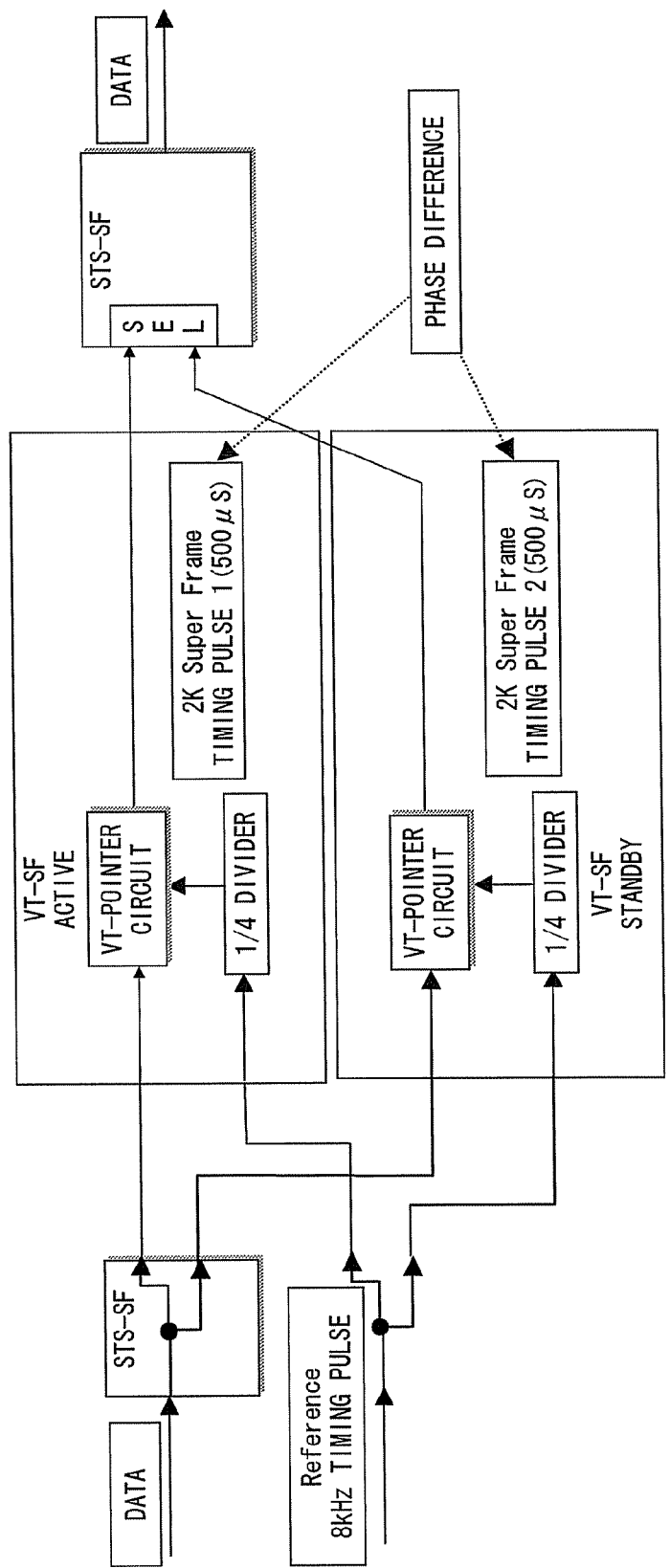
FIG. 11 is a schematic (No. 1) explaining the third factor which makes the pointer values of the active and the standby sides different.
Figure 12:
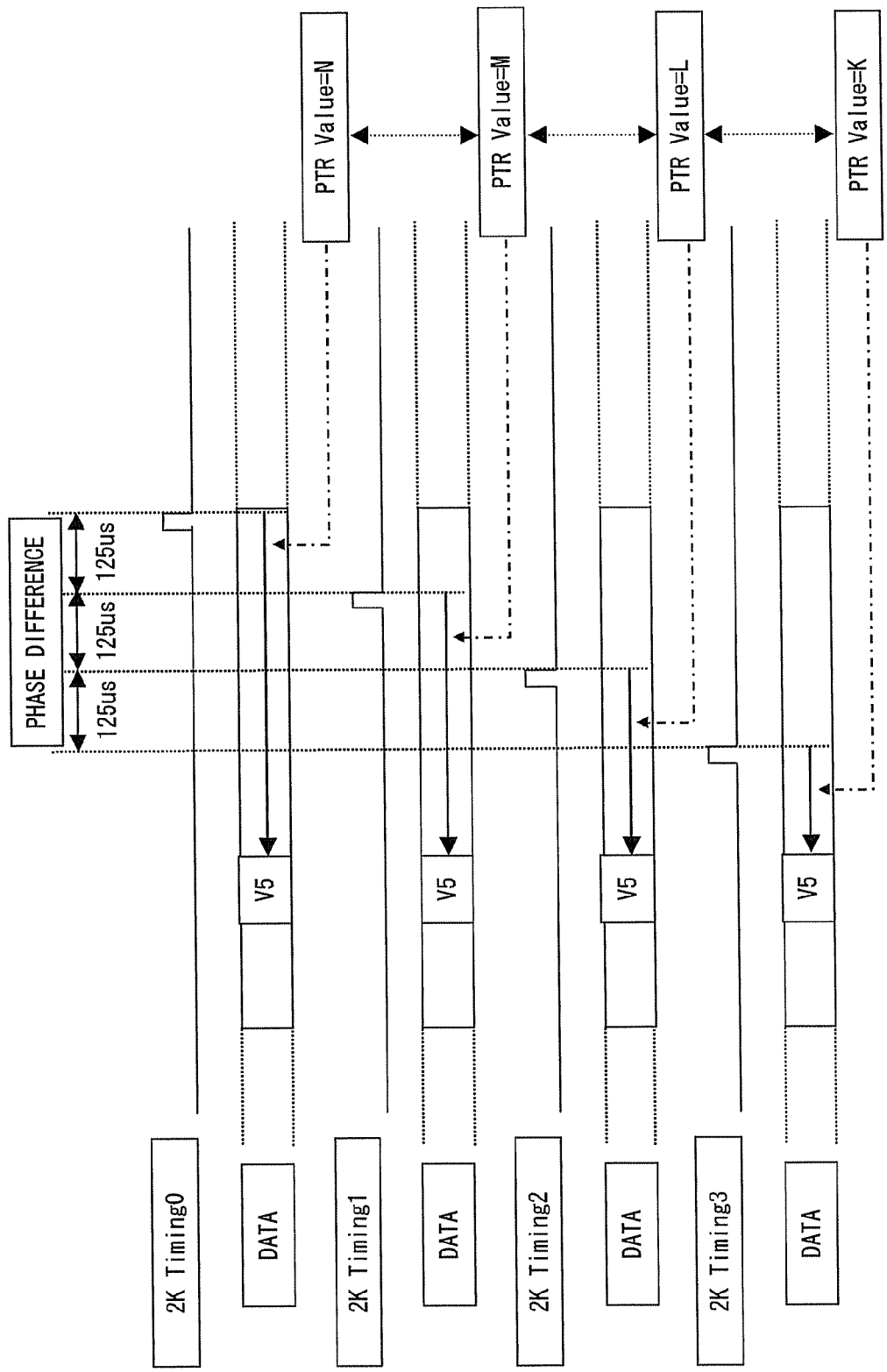
FIG. 12 is a schematic (No. 2) explaining the third factor which makes the pointer values of the active and the standby sides different.
Figure 13:
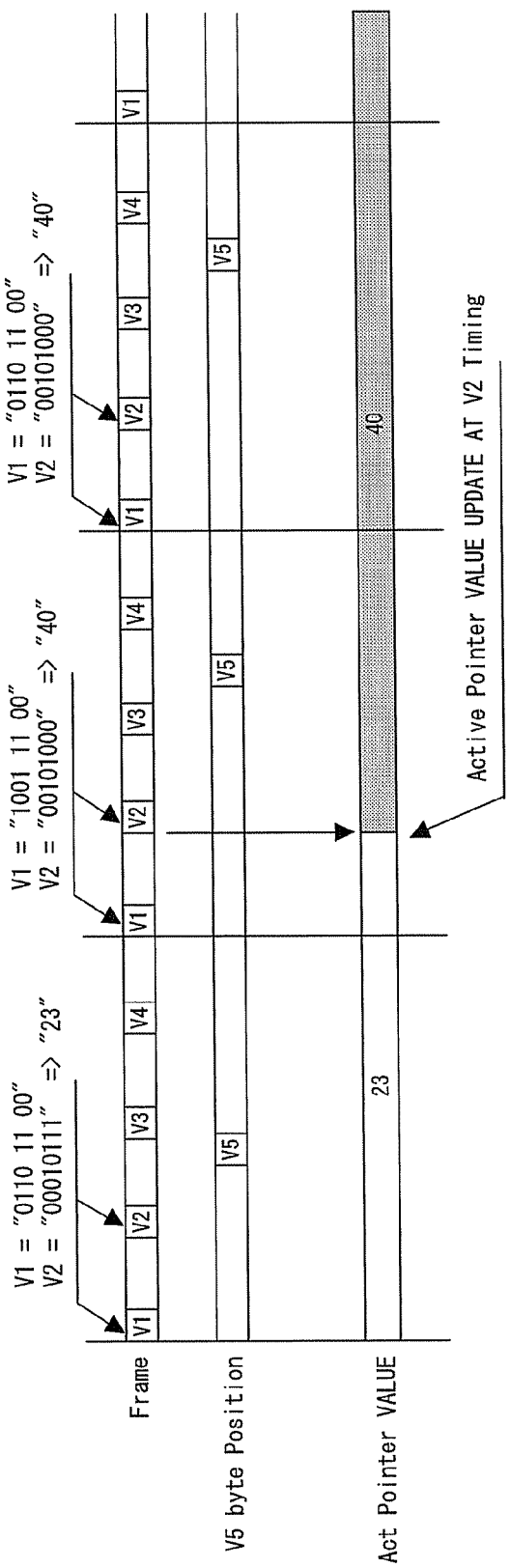
FIG. 13 is a schematic (No. 1) explaining an operation for changing an ACT-Pointer value.
Figure 14:
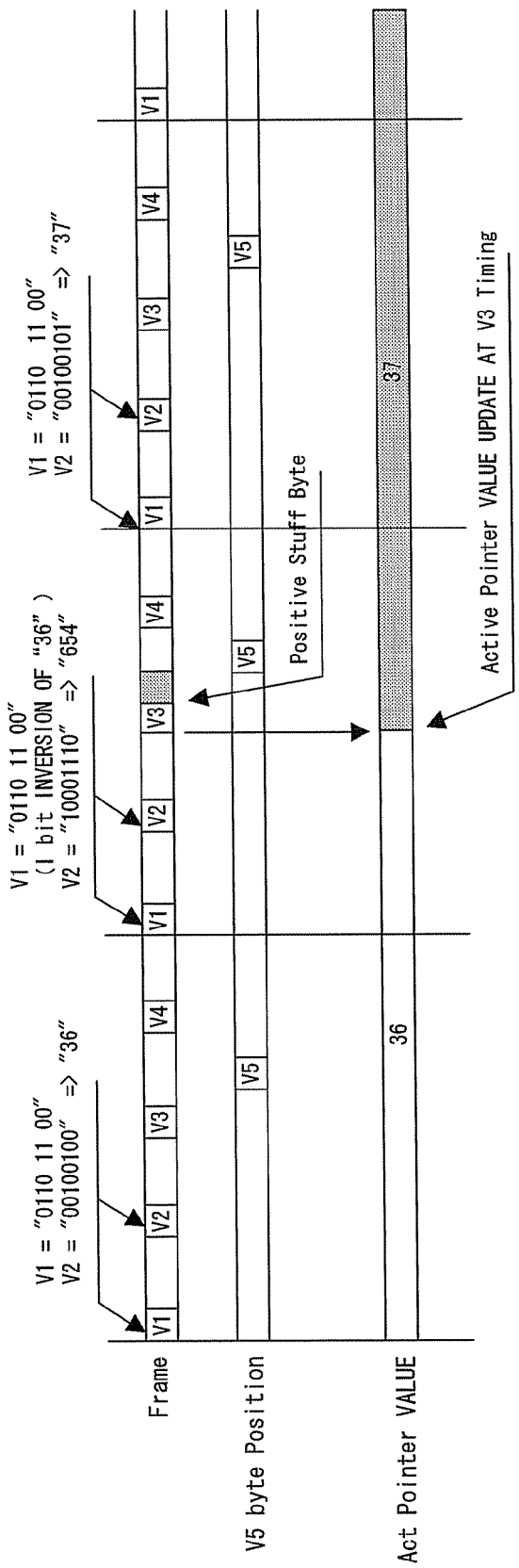
FIG. 14 is a schematic (No. 2) explaining the operation for changing an ACT-Pointer value.
Figure 15:
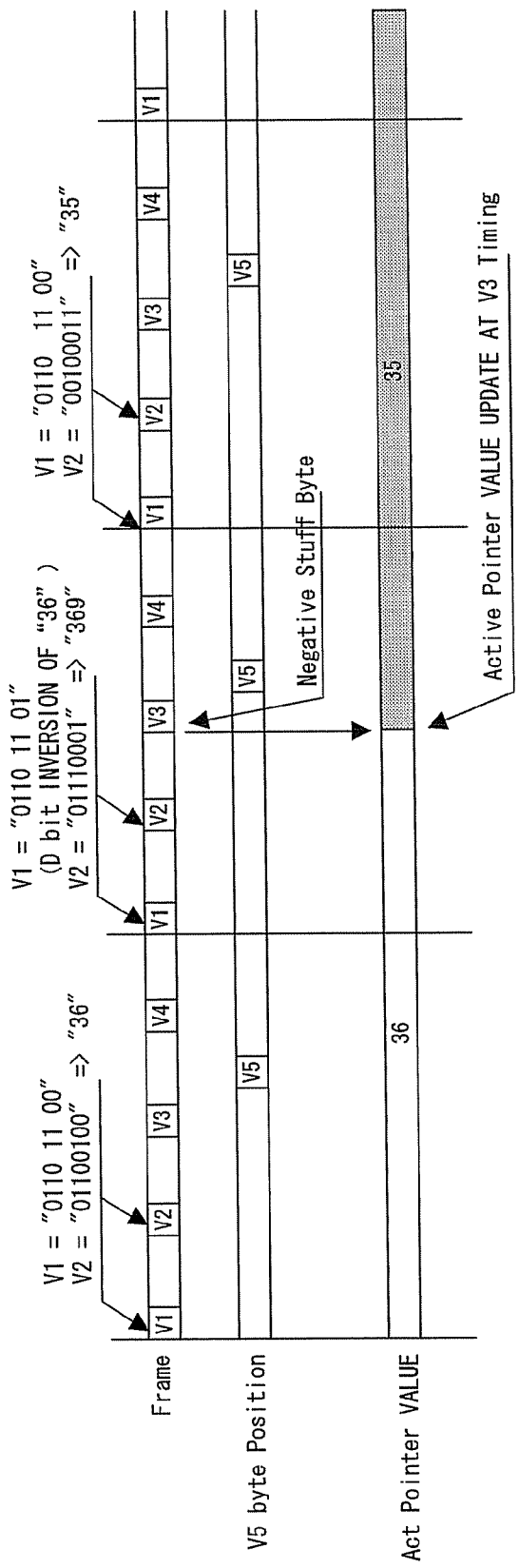
FIG. 15 is a schematic (No. 3) explaining the operation for changing an ACT-Pointer value.

With the configuration shown in FIG. 16, the pointer values of the active and the standby side can be made to match. The state where the pointer values of the active and the standby sides match does not become the states described by referring to FIGS. 8 and 9, and the operations performed when an OH gap occurs, which are shown in FIGS. 6 and 7, can be made to match.

In FIG. 16, a write (WR) clock is input to a WR superframe counter 42 in an active side VT pointer circuit 40. The WR superframe counter 42 counts superframe timing, and feeds a count enable signal to a WR address counter 43. Additionally, the WR superframe counter 42 extracts the timing of a V4 byte, and feeds the extracted timing to a hold circuit 44. The WR clock is input also to the WR address counter 43, which counts an address according to an enable signal. This address is input to the hold circuit 44, and fed to a memory 45. To the memory 45, write data is written based on this write address.

Additionally, a read (RD) clock is input to an RD superframe counter 49. The RD superframe counter 49 counts frame timing, and feeds a count enable signal to an RD address counter 48. Furthermore, the RD superframe counter 49 extracts the timing of a V4 byte, and feeds the extracted timing to a hold circuit 47. The RD clock is input also to the RD address counter 48, which counts an address according to an enable signal. This address is input to a hold circuit 47, and fed to the memory 45. From the memory 45, read data is read based on this read address.

A phase comparator 46 makes a comparison between the phases of addresses on the write and the read sides, and controls the RD address counter 48 in order to keep a definite phase difference.

The hold circuit 44 holds the address which matches the timing of the V4 byte among addresses input from the WR address counter 43, and inputs this address to a multiplexer 50. The hold circuit 47 holds the address which matches the timing of the V4 byte among addresses input from the RD address counter 48, and inputs this address to the multiplexer 50.

The multiplexer 50 maps the write address corresponding to the timing of the V4 byte on the write side and the read address corresponding to the timing of the V4 byte on the read side in a predetermined data format, and transmits the addresses to a VT pointer circuit 41 on the standby side.

A demultiplexer 59 of the VT pointer circuit 41 on the standby side sets the write address of the timing of the V4 byte, which is transmitted from the active side, in an offset counter 54, and also sets the read address in an offset counter 58. A WR superframe counter 51 counts the timing of superframe by using a WR clock as an input, and inputs the counted timing to a WR address counter 52. The WR address counter 52 counts a write address, feeds the counted address to a memory 53, to which the WR data is written. Additionally, to the WR address counter 52, the timing of a V2 byte is input, and a value obtained by adding an offset value to the write address of the timing of the V4 byte, which is obtained from the active side, is loaded. This means that the correction value of the WR address is loaded at the timing of the V2 byte, whereby the same WR address as that on the active side can be used. An RD superframe counter 57 counts the timing of superframe by using an RD clock as an input, and inputs the counted timing to an RD address counter 56. The RD address counter 56 counts a read address, and feeds the counted address to the memory 53, from which RD data is read. Additionally, to the RD address counter 56, the timing of a V2 byte is input, and a value obtained by adding an offset value to the read address at the timing of the V4 byte, which is obtained from the active side, is loaded from the offset counter 58. This means that the correction value of the RD address is loaded at the timing of the V2 byte, whereby the same RD address as that on the active side can be used.

A phase comparator 55 makes a comparison between the phases of the addresses on the write and the read sides, and controls the RD address counter 56 in order to keep a definite phase difference.

The above described operations continue while the device is running. If the write and the read addresses on the active and the standby sides match, these operations are continually performed to overwrite the address of the standby side with the address from the active side.

FIG. 17 shows the configuration of a mechanism for overcoming an occurrence of different pointer values on the active and the standby sides, which is caused by differences between physical delay times and between the timings of dividing a clock.

Within the SONET equipment, an 8-kHz frame timing clock is distributed from STS-SF to both the active and the standby sides. On the active side, this timing clock is divided, and a VT multi-frame timing clock of 2-kHz is generated. The 2-kHz multi-frame timing clock generated on the active side is transferred to the standby side, and the clock is reproduced and used. As a result, the phases of the read sides of the pointer circuits on the active and the standby sides can be made to match.

Furthermore, a memory from which a read can be made at the 2-kHz frame timing is arranged in order to make phases on the input sides of the pointer circuits match. For the read phase, a read from all of phases can be made by setting a counter value, and the phase of an input to the pointer circuit can be determined. This counter value is transferred to the standby side, and the value is reproduced and used, whereby the phases of inputs to the pointer circuits on the active and the standby side can be made to match.

In this memory configuration, write and read are defined to be made with reference to the starting position of Al of a SONET frame, and the number of stages of the memory is configured to be an integral number of stages, which can divide the number of clock counts of one frame of SONET.

Additionally, since the phases of the 8-kHz reference timing from Switch Fabric and its output data are not uniformly defined in some cases in this device, respective phase differences are detected, and a counter value is automatically set, whereby a difference between the phases of inputs to the pointer circuits can be made to match also for STS Switch Fabrics having different propagation delays.

Data having different input phases are read from the memory at a read position common to the active and the standby sides, and the data is input to the VT pointer circuits in the same phase.

In a VT-SF 60 on the active side, an 8-kHz timing clock is extracted from input SONET data 1 by an 8 k TP extracting unit 62. A write address counter 63 counts a write address, and the data 1 is written to a memory 64 with this address. A phase comparator 65 feeds an offset value of the extracted 8-kHz timing clock to a read address counter 66. Also a timing clock obtained by dividing the 8-kHz timing clock, which is distributed from STS-SF to each device, into 2-kHz by a ¼ counter 67 is input to the phase comparator 65. The phase comparator 65 makes a comparison between the phases of the input 8-kHz timing clock and 2-kHz timing clock, and sets an offset value to eliminate a phase difference. The read address counter 66, to which the 2-kHz timing clock and the offset value are input, feeds the read address to the memory 64, from which data is read. The read data is fed to the VT pointer circuit 40 as write data. The 2-kHz timing clock generated by being divided by the ¼ counter 67 is input also to the VT pointer circuit 40, which then uses this clock. In a VT-SF 61 on the standby side, an 8-kHz timing clock is extracted from input SONET data 2 by an 8 k TP extracting unit 68. A write address counter 69 counts a write address, and the data 2 is written to a memory 70 with this address. A phase comparator 71 feeds an offset value of the extracted 8-kHz timing clock to the read address counter 73, and either the fed offset value or the offset value transmitted from the active side is selected by a selector 72. Also the 2-kHz timing clock, which is generated by the ¼ counter 67 on the active side and reproduced, is input to the phase comparator 71. The phase comparator 71 makes a comparison between the phases of the input 8-kHz timing clock and the 2-kHz timing clock, and sets an offset value to eliminate a phase difference. A read address counter 73, to which the 2-kHz timing clock and the offset value are input, feeds the read address to a memory 70, from which data is read with this address. The read data is fed to the VT pointer circuit 41 as write data. The reproduced 2-kHz timing clock from the active side is input also to the VT pointer circuit 41, and used.

The offset value of the phase comparator 65 on the active side is transmitted to the read address counter 73 on the standby side via the selector 72. Additionally, the 2-kHz timing clock generated by the ¼ counter 67 on the active side is input to the counter 74 via a selector 75 on the standby side, and the timing clock is reproduced and used.

The 2-kHz timing clock on the active side is reproduced and used on the standby side, whereby the phases of the 2-kHz timing clocks match on the active and the standby sides, and a difference between the pointer values on the active and the standby sides, which is caused by a phase difference, can be resolved. Additionally, the offset value on the active side is transmitted to the standby side, whereby the read phase of data from the memory 70 on the standby side becomes the same as that from the memory 64 on the active side, and a delay difference between input data to the VT pointer circuits 40 and 41 disappears. Accordingly, also an occurrence of a difference between the pointer values, which is caused by a delay difference, can be prevented.

As shown in the bottom stage of FIG. 17, for data 1 and 2, a phase difference exists in positions (1) and (2) on the active and the standby sides. However, the data 1 and 2 are once stored in the memories 64 and 70, and their read timings are made to match, whereby signals the phases of which match can be realized in positions (3) and (4) on the active and the standby sides.

FIGS. 18 to 20B explain a data format used when data is transferred from the active side to the standby side in FIG. 16 in the preferred embodiment of the present invention.

To transfer information about a pointer process for VT signals of 1344 channels (the maximum number of channels of VT signals multiplexed on an STS signal), an STS12 signal to which STS-3c×4 are byte-multiplexed is used. A label is mapped in a J0 byte which exists in TOH (Transport Overhead) of the STS12 and indicates the state of a line connection to enable a determination of Ready/Connection Mismatch on an opposed side. Similarly, a 2-kHz timing flag and a read counter value are mapped in F1#1 and D1#1-#12 bytes in the TOH of the STS 12, which is then transferred to the standby side.

Furthermore, within the STS12 signal, information about the read counter (RD-CTR) on the transmitting side is mapped in a fixed position of the payload of the first STS-3c signal, also CRC10 is mapped in units of VT28chs, and the STS12 signal is transferred to the standby side. Lastly, information about the write counter (WR-CTR) on the receiving side is mapped in an arbitrary position of the payload of the third and the fourth STS-3c frames among 4 STS3c frames within the STS12 signal. When the mapping is made, an STS channel number and CRC10 are mapped in units of VT28chsin addition to the WR-CRT information, and the STS-12 signal is transferred to the standby side.

Figure 18:
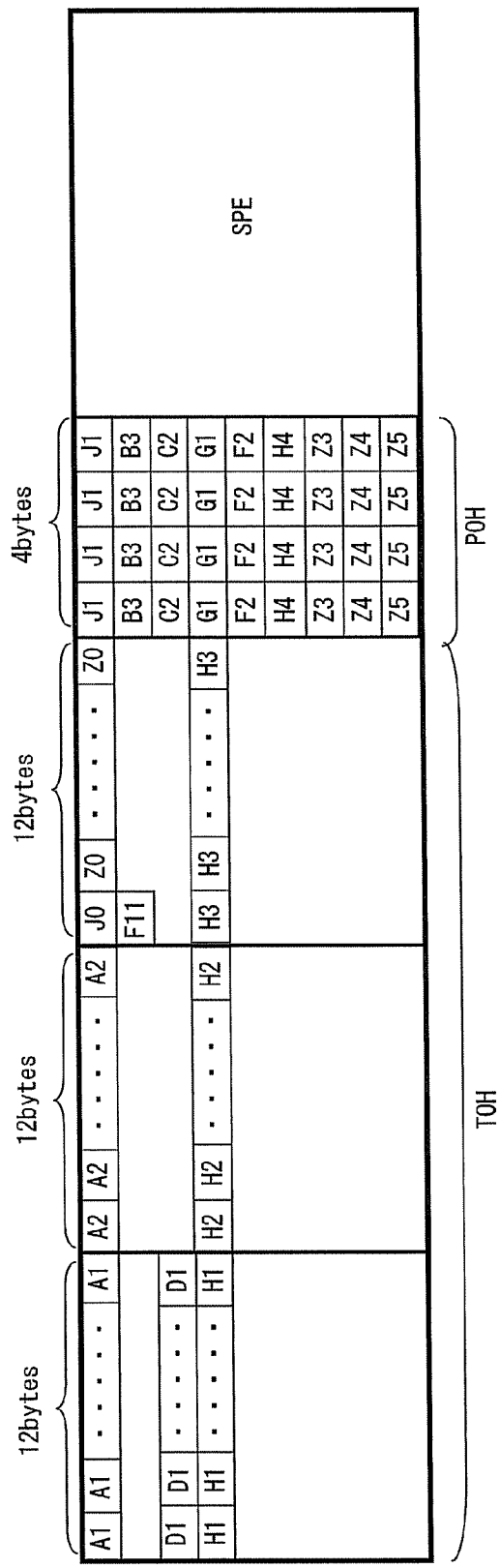
FIG. 18 is a schematic (No. 1) explaining a data format used when data is transferred from the active side to the standby side shown in FIG. 16 in the preferred embodiment of the present invention.

FIG. 18 shows an STS-12 frame. The STS-12 frame is a frame to which 12 STS-1 frames are multiplexed. Therefore, 12 A1 bytes and the like are included respectively within a transport overhead (TOH). However, this preferred embodiment according to the present invention uses as a unit an STS-3c signal obtained by concatenating 3 STS-1 frames. Therefore, an STS-12 frame includes 4 STS-3c frames. Accordingly, a path overhead (POH) includes 4 J1 bytes and the like respectively.

Figure 19:
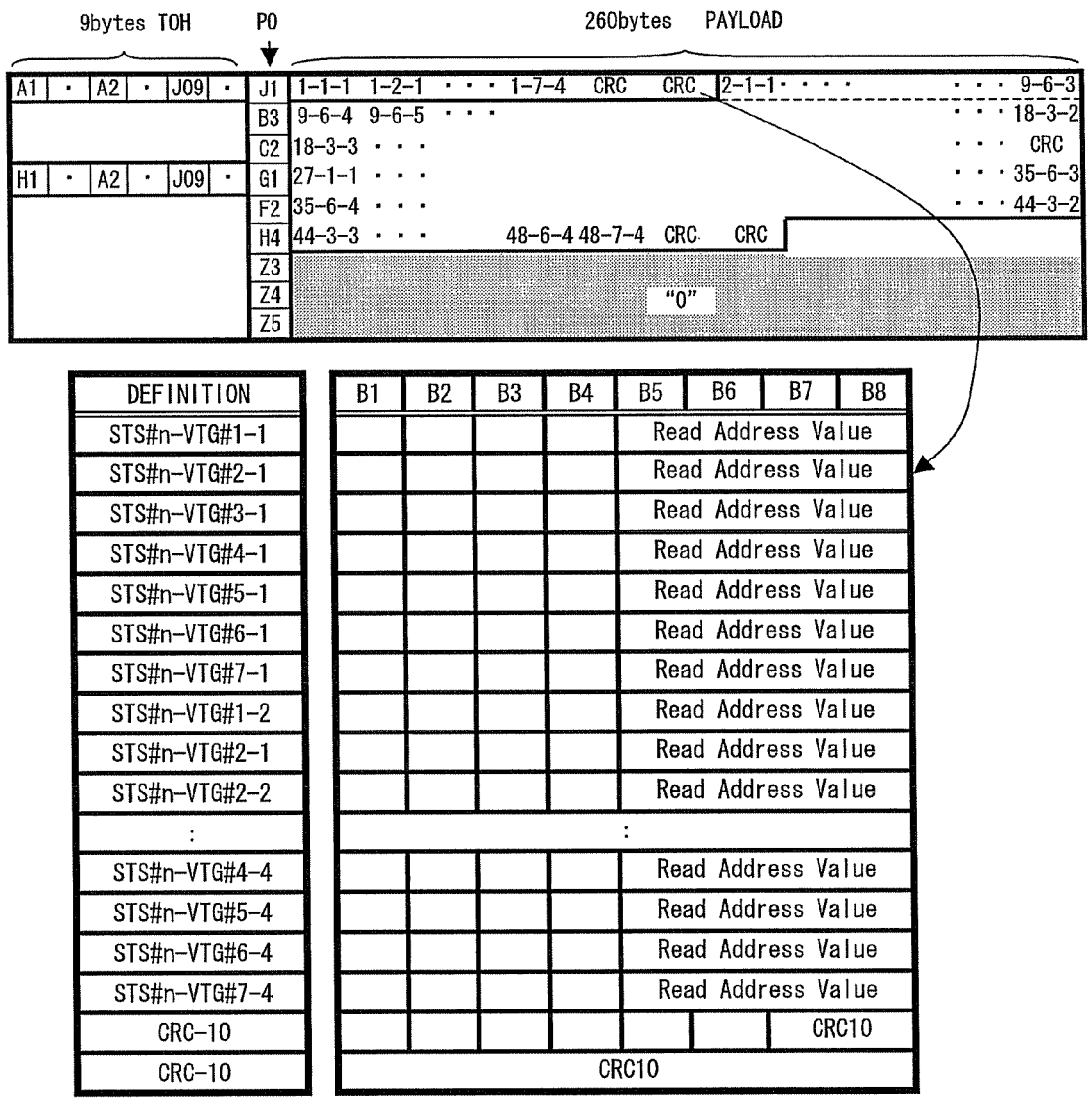
FIG. 19 is a schematic (No. 2) explaining a data format used when data is transferred from the active side to the standby side shown in FIG. 16 in the preferred embodiment of the present invention.

FIG. 19 explains a method for mapping the first STS-3c frame included in the STS-12 frame.

In this figure, the initial numeral 9 of 9-6-4 is the number of an STS signal including 1 byte of a VT signal by 28 channels, and the succeeding 6-4 indicates the number of a VT channel included in one STS signal. 28 channels from 1-1 to 7-4 form one STS signal. The STS-3c signal stores 48 STS signals in its payload. A read address is buried in the last 4 bits of each VT signal as shown in the lower portion of FIG. 19. A CRC10 is appended to detect an error in units of 28 channels. An erroneous signal in units of 28 channels is descarded.

The second STS-3c frame included in the STS-12 frame is reserved.

FIGS. 20A and 20B explain a method for mapping the third and the fourth STS-3c frames included in the STS-12 frame.

As shown in FIG. 20A, ATM cells of 36-byte length are fixedly mapped in each of the payloads of the STS-3c#3 and #4. An STS pointer value is set to 0. The cells are used in units of STS (VT28 channels). As shown in FIG. 20B, a write address is set in the last 4 bits of a channel byte of each cell. The reason of formatting the payload with not VTs like an STS-3c#1 but cells is as follows. Since the transmission timing of a write address depends on an externally fed signal, the timing when the transmission timing occurs cannot be predicted. Therefore, the payload is partitioned into cells, which are smaller units, in order to allow the write address to be transmitted from the active side to the standby side quickly at any timing.

Figure 21:
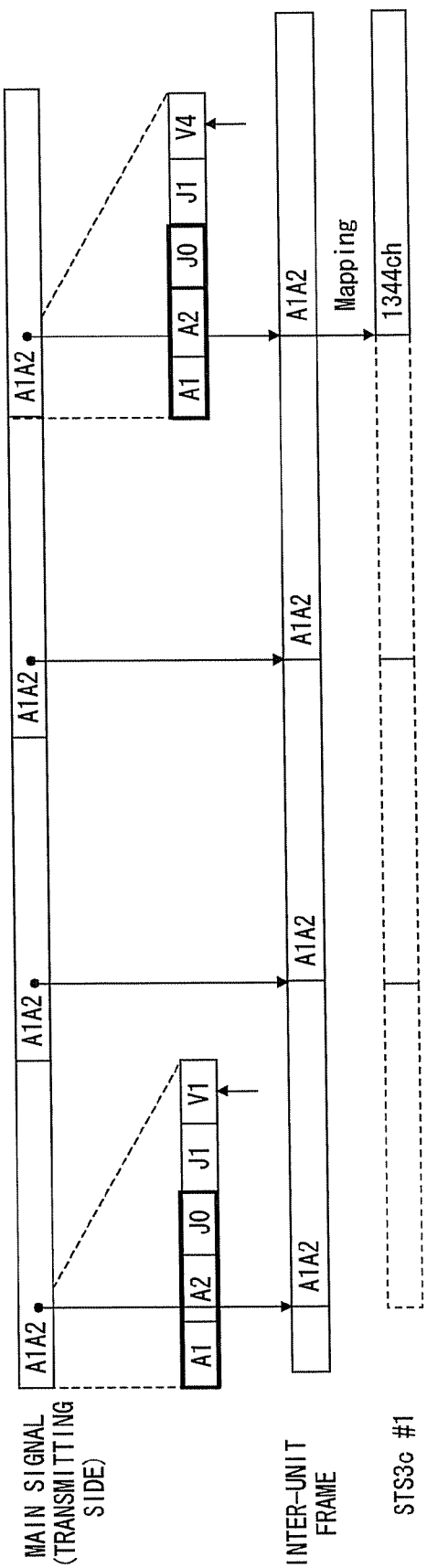
FIG. 21 is a diagram (No. 1) showing the generation of an STS12 frame.

FIGS. 21 and 22 are diagrams for generating the STS 12 frame.

To minimize the propagation delay time of the value of the RD-CTR (read address counter), the STS 12 frame is generated with reference to the timing of an occurrence of a V4 byte on the transmitting side of a VT pointer circuit. Namely, in FIG. 21, the timing of generating an inter-unit frame (STS-12) on the active and the standby sides is produced at the timing when a main signal is transmitted. A read counter value is mapped in an STS-3c#1, which is an inter-unit frame, at the timing when the V4 byte counted third from when a V1 byte is transmitted. Since the detection position of a V4 byte on the receiving side, which determines the value of the WR-CTR (write address counter), is irrelevant to the phase of a main signal (STS12) that carries data as shown in FIG. 22. The read counter value is mapped in the STS-3c#3 and #4 cells, which are inter-unit frames, on demand in accordance with the detection position of the V4 byte. Additionally, as shown in FIG. 16, a plurality of write address counter values are transmitted to the multiplexer 50. In this case, the counter values are mapped in cells in an order where the write address counter values reach the multiplexer 50, thereby minimizing each transfer time.

Figure 23:
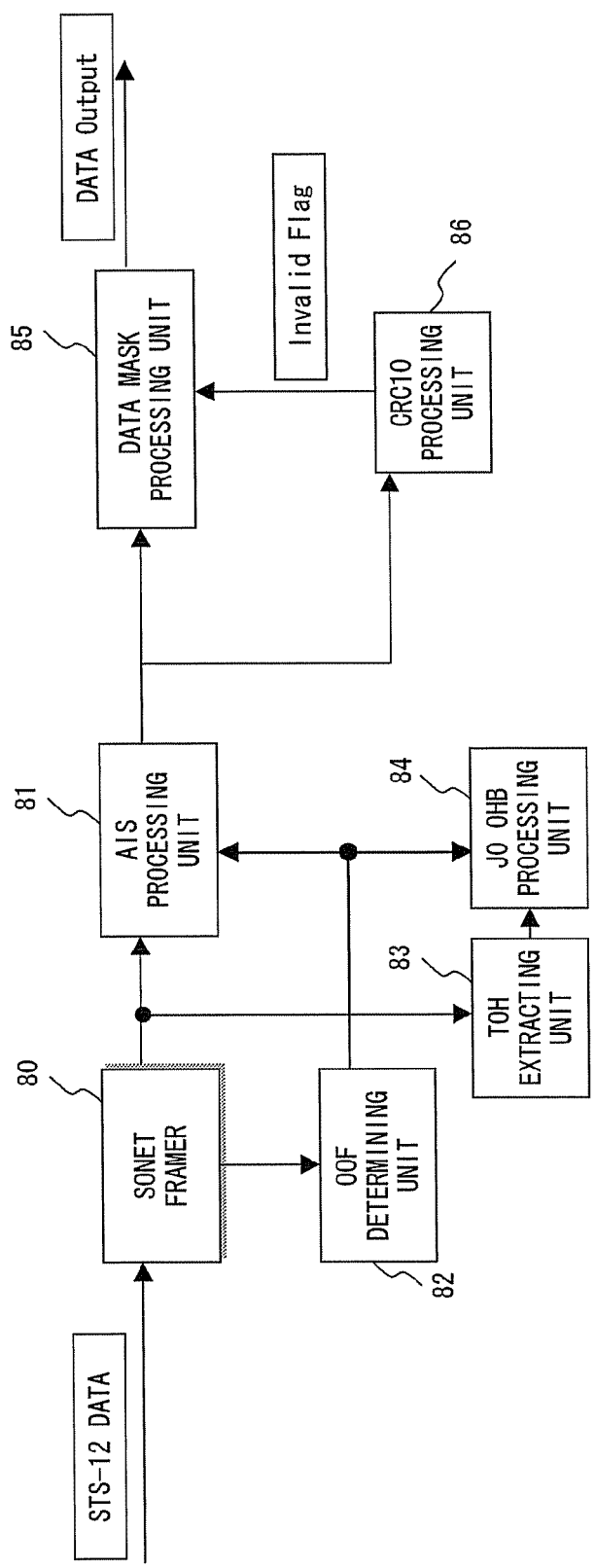
FIG. 23 is a schematic showing the configuration of a receiving unit of an STS12 frame, which is an inter-unit frame.

FIG. 23 shows the configuration of a receiving unit of the STS12 frame, which is an inter-unit frame.

On the standby side, the STS12 frame, which is an inter-unit frame, is received by the demultiplexer 59. At this time, on the standby side, data capturing is disabled in order to prevent illegal data from being captured when a SONET framer 80 detects out-of-synchronization of frames. Additionally, if the STS12 frame is in a synchronization state, Ready or Connection Mismatch of a SONET line is determined according to a predefined Label (00‾FFhex), and information capturing is disabled in these states in a J0 OHB processing unit 84. If information mapped in the payload of the STS12 frame is captured, a bit error sometimes occurs while data is propagated in the STS12 frame. In this case, an arithmetic for each CRC10 is performed in order to prevent erroneous information from being captured, and data capturing is disabled when an error is detected.

In the SONET framer 80, A1 and A2 bytes of the input STS12 signal are received, and frames synchronization is made. In a case of out-of-synchronization of frames, an OOF (Out Of Frame) determining unit 82 generates AIS-P and Invalid Flag for masking a J0 byte. Namely, if the SONET framer 80 determines that the signal is in synchronization, a TOH extracting unit 83 extracts the J0 byte, and a J0 OHB processing unit 84 detects an error based on the J0 byte. If the OOF determining unit 82 or the J0 OHB processing unit 84 determines out-of-synchronization or an error, an AIS processing unit 81 pads the entire payload with 1 to make settings for causing a subsequent CRC10 processing unit 86 to process the signal as error data.

A DATA MASK process is performed if the CRC10 processing unit 86 performs a CRC10 arithmetic of data mapped in the payload of the SONET signal and determines an error. Namely, erroneous data is discarded in the DATA MASK processing unit 85.

Figure 24:
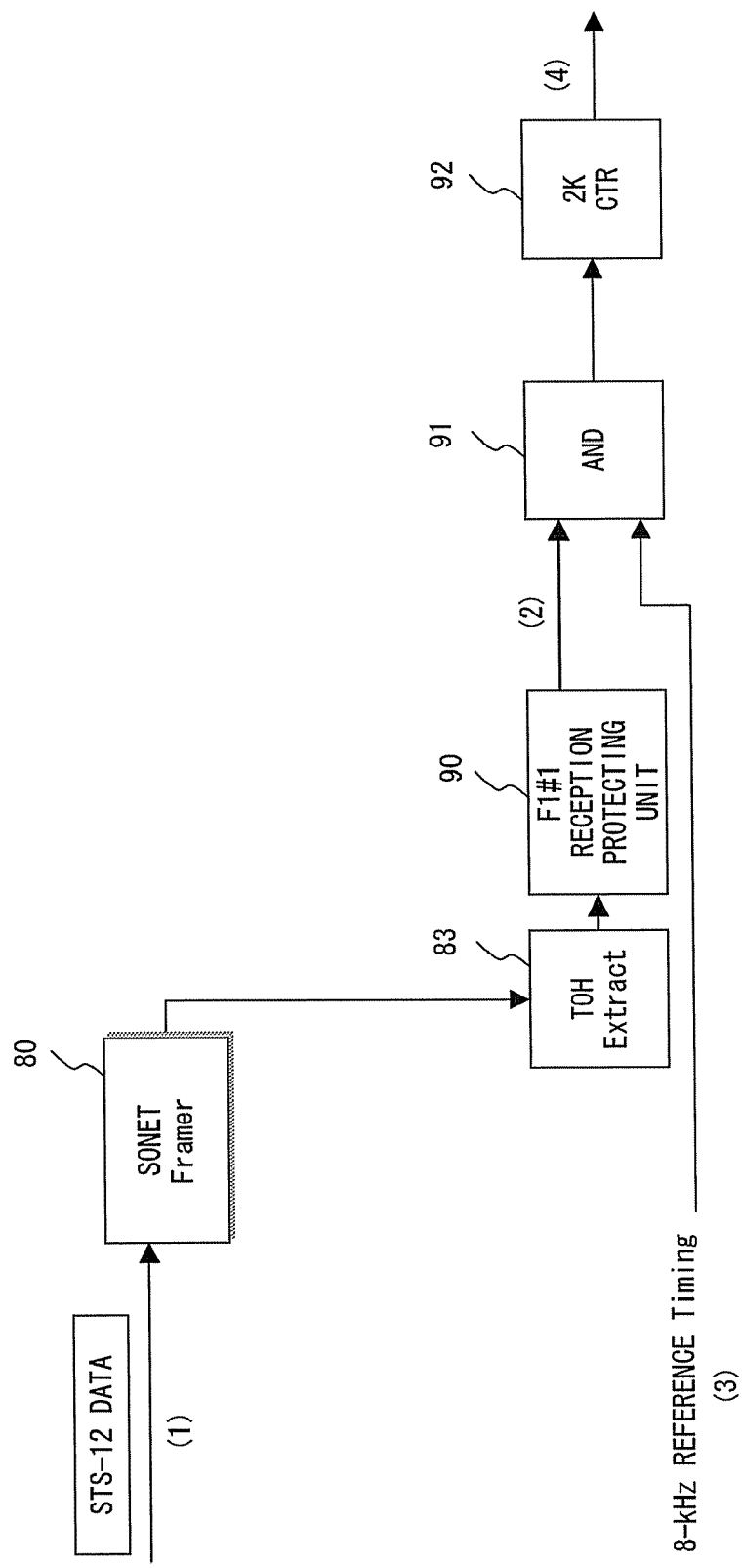
FIG. 24 is a schematic (No. 1) explaining a method for transmitting 2-kHz timing from the active side to the standby side, and for reproducing a 2-kHz timing clock on the standby side.
Figure 26:
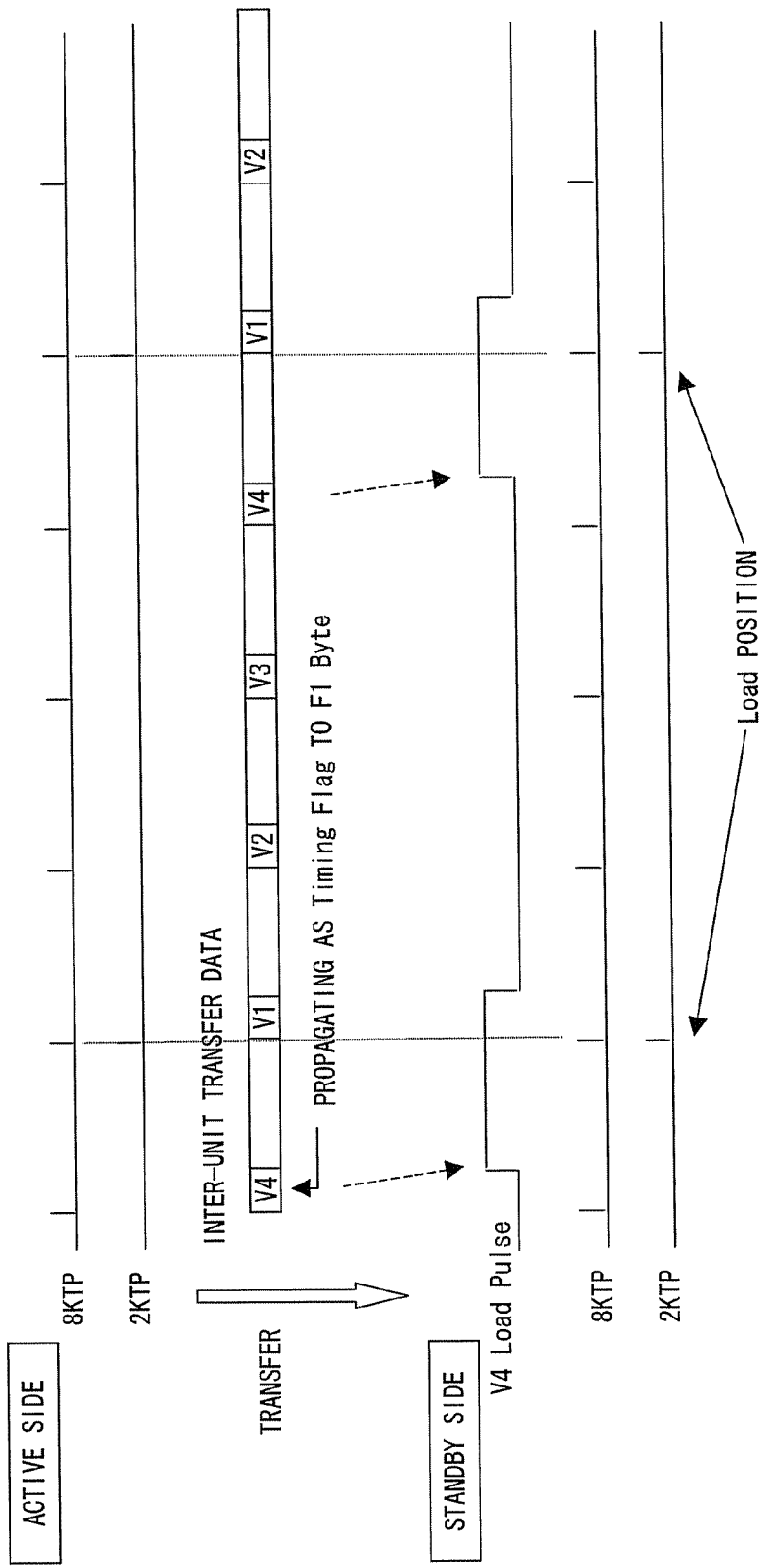
FIG. 26 is a schematic (No. 3) explaining the method for transmitting 2-kHz timing from the active side to the standby side, and for reproducing a 2-kHz timing clock on the standby side.

FIGS. 24 to 26 explain a method for transmitting 2-kHz timing from the active side to the standby side, and for reproducing a 2-kHz timing clock on the standby side.

FIGS. 24 and 25 explain a method for capturing 2-kHz timing. As shown in FIG. 24, for the STS-12 frame received by the SONET framer 80, the value of the F1#1 byte extracted by the TOH extracting unit 83 is detected for successive multi-frames. If the values match by a plural number of successive times (three times in this figure), 2-kHz timing is captured. The device on the standby side loads the 2-kHz timing to the respective counters of the device itself based on that information. An F1#1 reception protecting unit 90 counts the number of times that the F1#1 byte is detected. If the F1#1 byte is received successively, for example, three times, the timing of the F1#1 byte is output to an AND circuit 91. To the AND circuit 91, also the 8-kHz reference timing is input. If the timing of the F1#1 byte and that of the 8-kHz reference timing match, the timing of starting the counting is loaded to a 2 k counter 92.

FIG. 25 shows the timings of respective signals. In this figure, a signal A is a 2-kHz timing clock signal on the active side, whereas a signal B is an 8-kHz timing clock on the active side. As shown by the signal A, when the pulse of the 2-kHz timing clock occurs on the active side, a flag is set in an F1#1 byte in an inter-unit frame in synchronization with the 8-kHz timing of the signal B (timing a) when the pulse of the 2-kHz timing clock occurs on the active side. The flag set in the F1#1 byte is received by the standby side (timing b of a signal (1)). When the flag set in the F1#1 byte is received by the standby side three successive times, timing of the F1#1 byte is generated like a signal (2). This timing and the 8-kHz timing of a signal (3) on the standby side are ANDed, whereby the 2-kHz timing clock, which is synchronous with the active side, is generated on the standby side like a signal (4).

FIG. 26 explains the load timing of the 2-kHz timing on the standby side. The timing of the V4 byte on the generation side (active side) is propagated as a 2-kHz timing flag as shown in FIG. 26. This timing flag is latched and loaded at the 8-kHz timing input from STS switch Fabric, whereby 2-kHz timing on the standby side is reproduced.

FIG. 27 explains a configuration which makes the phases of input data to the pointer circuits match. In this figure, the same constituent elements as those shown in FIG. 17 are denoted with the same reference numerals, and their explanations are omitted.

To make the read phases of the memories 64 and 70 match, a process for determining whether or not D1#1 to D1#12 bytes match three successive times is performed, and the counter load value of the RD address counter 66, which is obtained as a result of the process, is transmitted to the RD address counter 73 on the standby side, whereby the phases of data input to the pointer circuits on the active and the standby sides can be made to match.

A multiplexer 97 maps the value of the RD address counter 66 in the D1#1 to #12 bytes of the inter-unit frames on the active and the standby sides, and transmits the frames to a demultiplexer 98. The demultiplexer 98 extracts the D1#1 to #12 bytes after the matching process performed three successive times, and the counter value obtained from these bytes is loaded to the RD address counter 73.

Active/standby selectors 95 and 96 make switching between devices respectively serving as those on the active and the standby sides. Namely, if the active device and the standby side device are switched, the value of the RD address counter is loaded from the device which serves as that on the active side to the device which serves as that on the standby side. Namely, if a device 97 serves as that on the active side, the value of the RD address counter 66 is loaded to the RD address counter 73. Or, if a device 98 serves as that on the active side, the value of the RD address counter 73 is loaded to the RD address counter 66. This is switched by active/standby selectors 95 and 96. Actually, the multiplexer 97 also has a function of the demultiplexer, whereas the demultiplexer 98 also has a function of the multiplexer 97.

This can be said not only to FIG. 27 but also to FIGS. 16 and 17. Namely, if the active and the standby sides are switched, a counter value and a 2-kHz timing clock are transmitted from a device, which newly serves as that on the active side, to a device which newly serves as that on the standby side. This can be easily realized if the active and the standby devices on the active and the standby sides are configured in a symmetrical manner.

Figure 28:
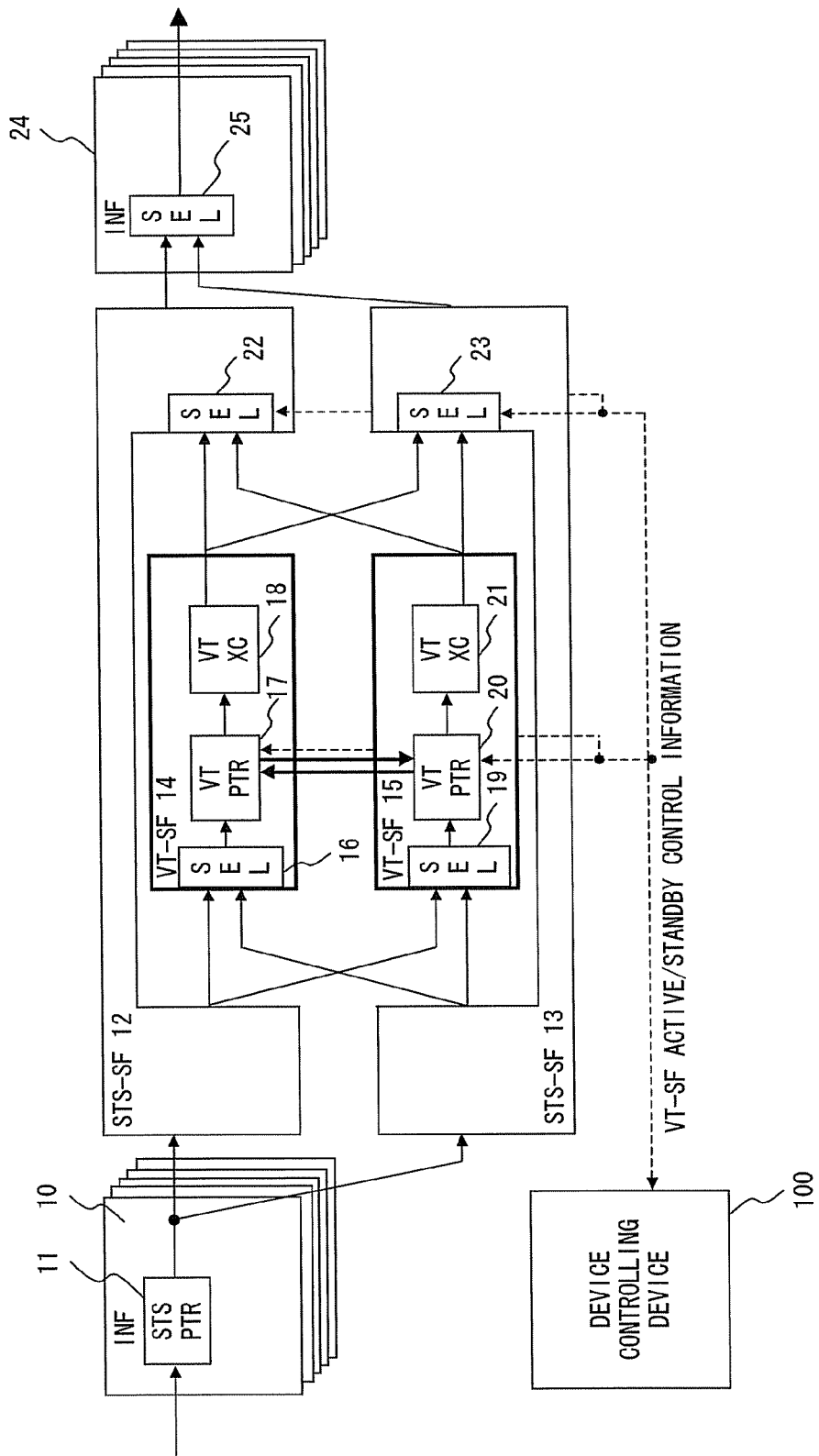
FIG. 28 summarizes the principle of the preferred embodiment according to the present invention.

FIG. 28 summarizes the principle of the preferred embodiment according to the present invention. In this figure, the same constituent elements as those shown in FIG. 3 are denoted with the same reference numerals, and their explanations are omitted.

Figure 1:
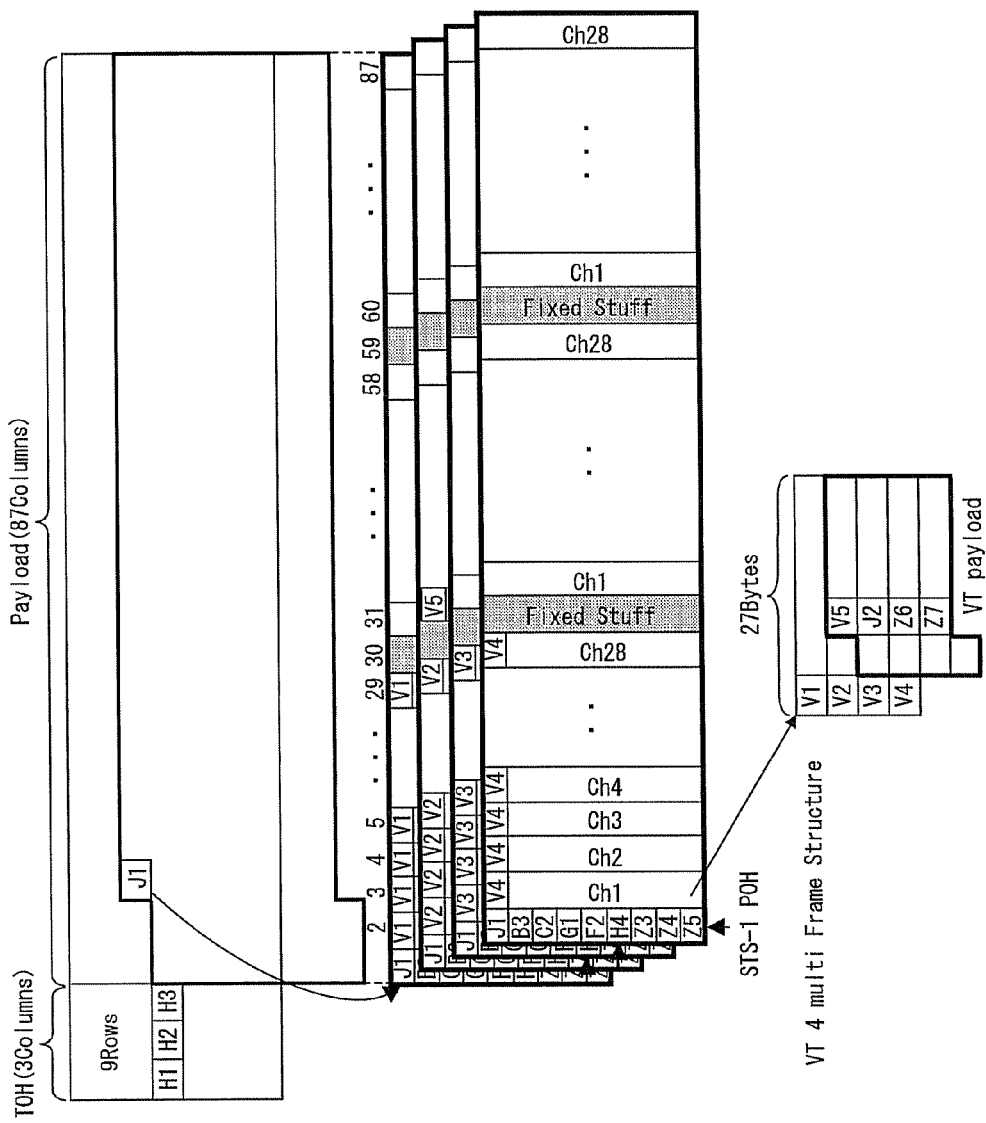
FIG. 1 is a schematic showing the structure of an STS-1 frame in a SONET system.
Figure 2A:
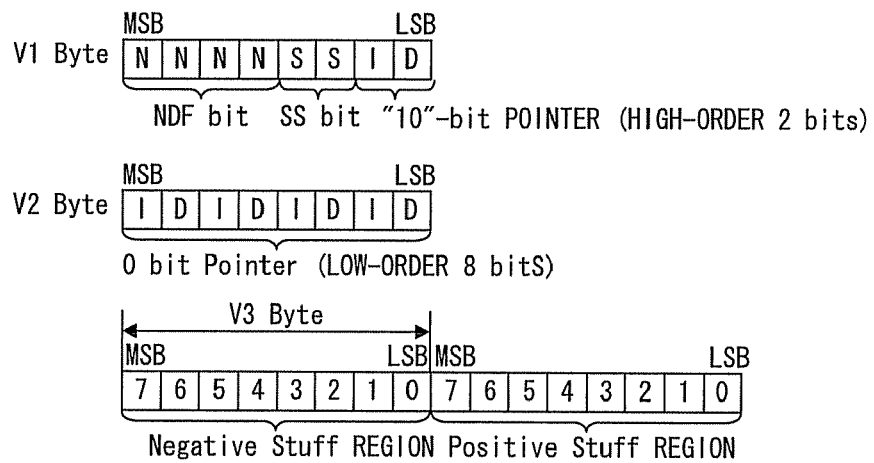
FIGS. 2A and 2B are schematics explaining a VT pointer.
Figure 2:
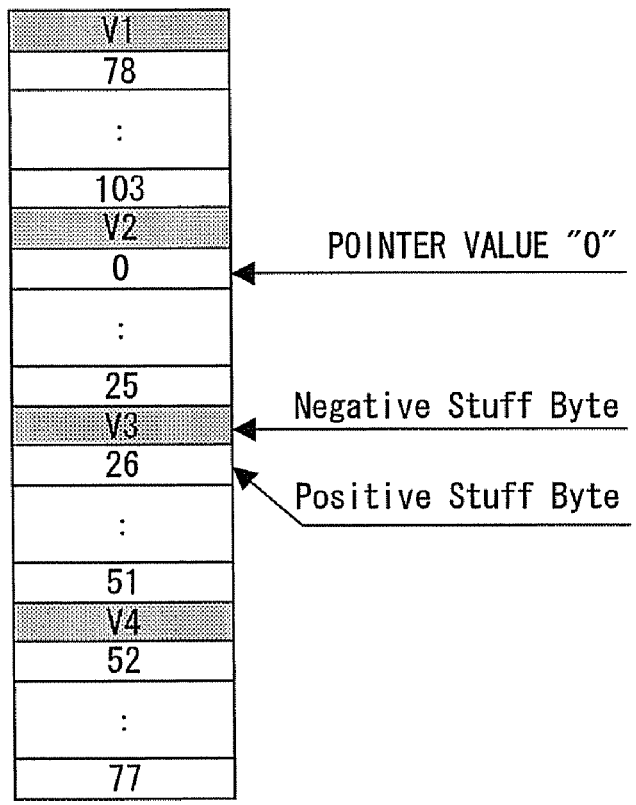
Figure 3:
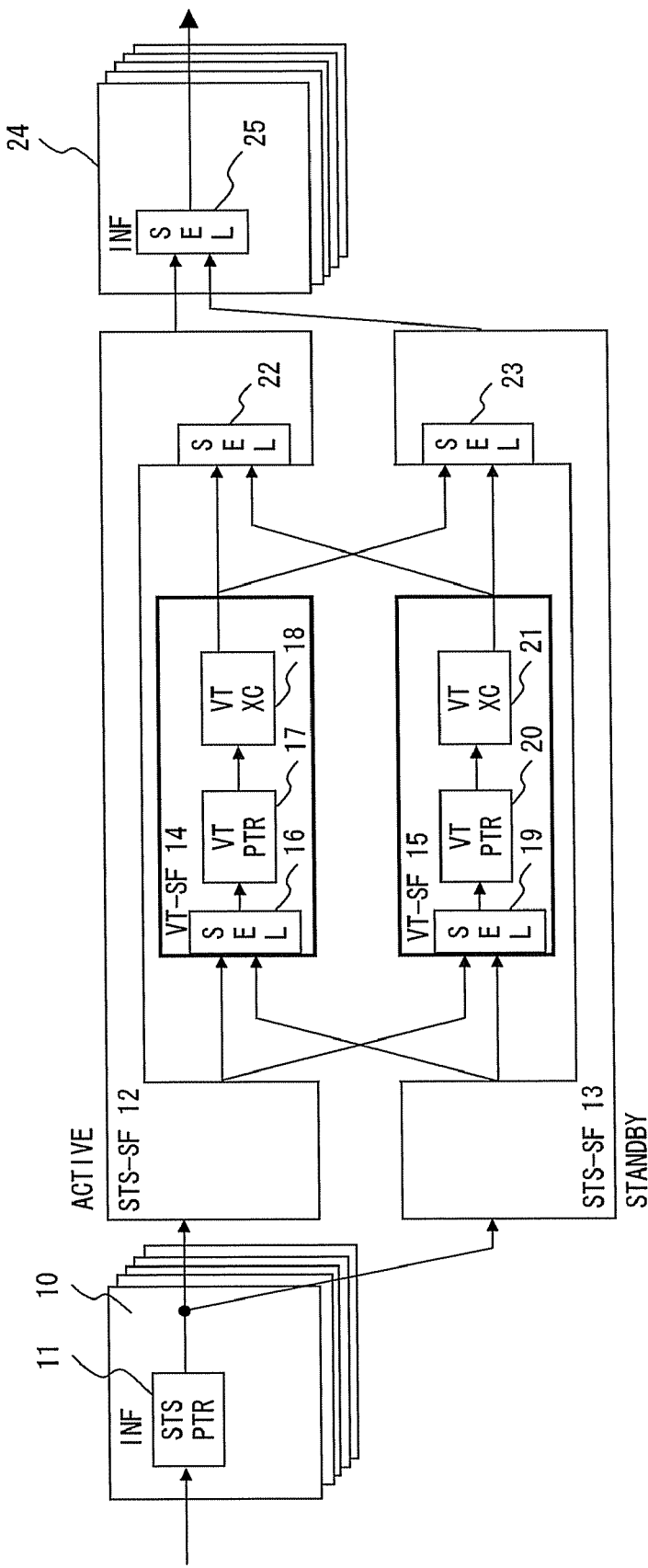
FIG. 3 is a schematic showing Switch Fabric mounted with a VT pointer circuit and a crossconnect circuit.
Figure 4:
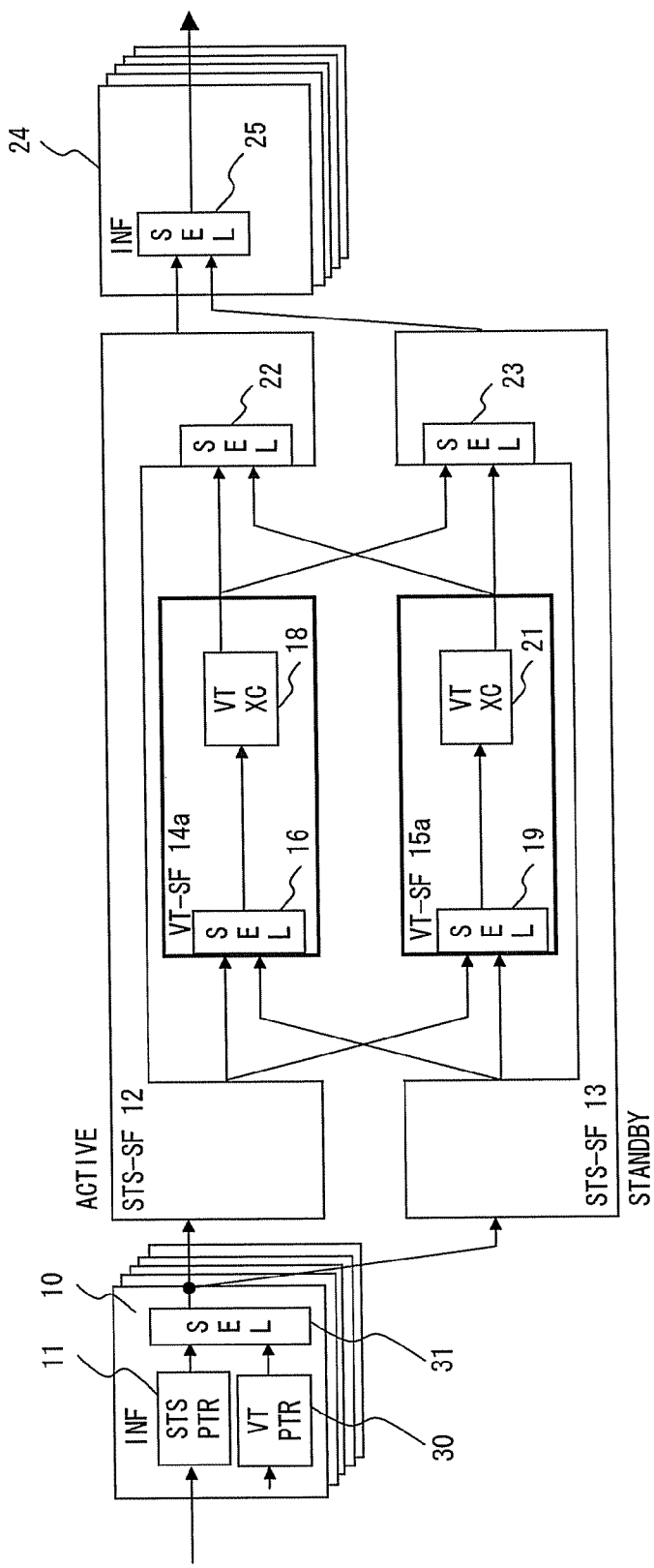
FIG. 4 is a schematic showing Switch Fabric having a configuration where a VT pointer circuit is arranged within an interface device.
Figure 5:
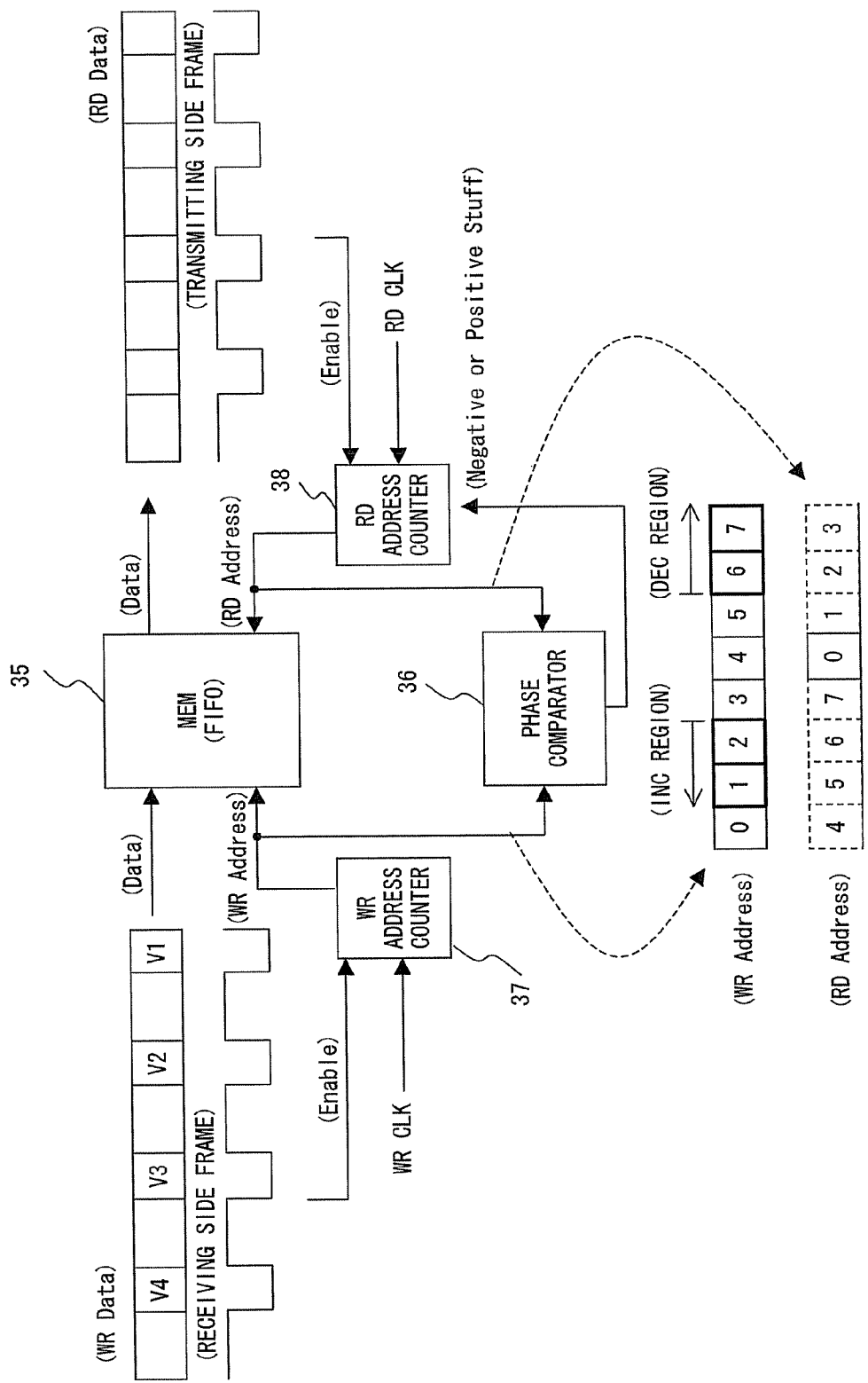
FIG. 5 is a schematic showing the fundamental configuration of a VT pointer circuit.

Comparing with FIG. 3, a connection for an information transfer is added to a midway between VT pointer blocks 17 and 20 in the preferred embodiment according to the present invention. VT Switch Fabrics 14 and 15 respectively obtain information about whether the Switch Fabrics 14 and 15 themselves serve either as an active device or as a standby side device according to the selection controls of selectors 16, 19, 22, and 23, which are controlled by a device controlling device 100 and provided in the STS Switch Fabrics 12 and 13. VT Switch Fabrics 14 and 15 respectively determine whether the Switch Fabrics serve either as the active side device or as the standby device based on this information, and perform a control for making VT pointer values match based on the information from the VT pointer block 17 on the active side only in the case of the standby side device.

Once the pointer operations match, subsequently output pointer values continue to match. Therefore, the VT Switch Fabric on the standby side can be switched to the VT Switch Fabric on the active side at any time. Note that the unit set as the active side device before switching is controlled as a standby device by the device controlling device 100 after switching, and performs a control for making VT pointer values match based on information from the active side VT pointer block.

What is claimed is:

1. A momentary-disconnection-free switching device, which processes a data frame of a synchronous communication network, in a redundant network device, comprising:
a first pointer processing unit as an active device, to process a pointer which indicates a starting position of a payload included in a subframe accommodated by the data frame;
a second pointer processing unit, as a standby device of said first pointer processing unit, to process a pointer which indicates a starting position of a payload included in the subframe;
a transferring unit to transfer write and read address values, which are used to process the pointer, of data to/from a memory from said first pointer processing unit as an active device to said second pointer processing unit as a standby device;
a clock generating unit to generate a first timing clock, which is intended to drive said first pointer processing unit, from a common high-frequency timing clock; and
a clock reproducing unit to reproduce a second timing clock, which is intended to drive said second pointer processing unit and a phase of which matches a phase of the first timing clock, from the first timing clock generated by said clock generating unit, wherein
said second pointer processing unit as the standby device processes a pointer by using the write and read address values transmitted from said first pointer processing unit as an active device and wherein
said first pointer processing unit and said second pointer processing unit are driven respectively based on the first and the second timing clocks, whereby said first pointer processing unit and said second pointer processing unit are driven with timing clocks having a same phase.

2. The momentary-disconnection-free switching device according to claim 1, comprising:
a first memory unit to adjust a phase of data input to said first pointer processing unit;
a second memory unit to adjust a phase of data input to said second pointer processing unit; and
a controlling unit to cause a data read from said second memory unit in a same phase as a data read from said first memory unit by using a read address obtained by applying a phase difference between the read and the write addresses of said first memory unit to a write address of said second memory unit.

3. The momentary-disconnection-free switching device according to claim 1, wherein
the synchronous communication network is SONET.

4. The momentary-disconnection-free switching device according to claim 3, wherein
the subframe is a virtual tributary frame.

5. The momentary-disconnection-free switching device according to claim 4, wherein
said first and said second pointer processing units are virtual tributary pointer circuits.

6. The momentary-disconnection-free switching device according to claim 5, wherein
write and read addresses of data next to a V4 byte of data input to said first pointer processing unit are transferred to said second pointer processing unit, and said second pointer processing unit captures the addresses at timing of a V2 byte of a next subframe.

7. The momentary-disconnection-free switching device according to claim 6, wherein
an offset value is added to values of the addresses captured at the timing of the V2 byte.

8. The momentary-disconnection-free switching device according to claim 7, wherein the offset value is given by (length of a payload of subframe)−(the number of stages of memory)×(an address value counted when data passes through one stage of the memory).

9. The momentary-disconnection-free switching device according to claim 1, wherein
said transferring unit transfers an address value by using an STS-12 signal to which an STS-3c frame of SONET is byte-multiplexed.

10. The momentary-disconnection-free switching device according to claim 9, wherein
if out-of-synchronization of frames occurs at the time of receiving the STS-12 signal, the received signal is disabled.

11. The momentary-disconnection-free switching device according to claim 9, wherein
a label is mapped in a J0 byte included in a transport overhead of the STS-12 signal, and a determination of Ready/Connection Mismatch of a communication line on a transmitting/receiving side is enabled.

12. The momentary-disconnection-free switching device according to claim 9, wherein:
the high-frequency timing clock is an 8-kHz timing clock, and the first and the second timing clocks are 2-kHz timing clocks;
a 2-kHz timing flag is mapped in an F1#1 byte of a transport overhead of the STS-12 signal; and
the second timing clock is reproduced from the first timing clock by detecting the 2-kHz timing flag.

13. The momentary-disconnection-free switching device according to claim 9, wherein
the read address value of said first pointer processing unit is mapped in a fixed position of a payload of a first STS-3c frame within the STS-12 signal, and an error correction code of the mapped address value is mapped along with the address value by using a VT signal of 28 channels as a unit.

14. The momentary-disconnection-free switching device according to claim 9, wherein
an ATM cell is mapped in a payload of third and fourth STS-3c frames within the STS-12 signal, and the write address value of said first pointer processing unit is mapped in the ATM cell.

15. The momentary-disconnection-free switching device according to claim 2, wherein said controlling unit maps information about data read timing from said second memory unit in D1#1 to D1#12 bytes of a transport overhead of a STS-12 signal, and the signal is transferred from said first memory unit to said second memory unit.

16. A momentary-disconnection-free switching device, which processes a data frame of a synchronous communication network, in a redundant network device, comprising:
a first pointer processing unit as an active device, to process a pointer which indicates a starting position of a payload included in a subframe accommodated by the data frame;
a second pointer processing unit, as a standby device of said first pointer processing unit, to process a pointer which indicates a starting position of a payload included in the subframe; and
a transferring unit to transfer write and read address values, which are used to process the pointer, of data to/from a memory from said first pointer processing unit as an active device to said second pointer processing unit as a standby device, and
wherein
said second pointer processing unit as the standby device processes a pointer by using the write and read address values transmitted from said first pointer processing unit as an active device, and
write and read addresses of data next to a V4 byte of data input to said first pointer processing unit are transferred to said second pointer processing unit, and said second pointer processing unit captures the addresses at timing of a V2 byte of a next subframe.

\* \* \* \* \*